United States Patent [19] [11] 4,210,577
Minagawa et al. [45] Jul. 1, 1980

[54] STABILIZERS FOR SYNTHETIC POLYMERS COMPRISING 2,2,6,6-TETRAMETHYL-4-PIPERIDYL CARBOXYLIC ACID ESTER, PHOSPHONIC ACID ESTER AND PHENOL

[75] Inventors: Motonobu Minagawa, Kosigaya; Yutaka Nakahara, Iwatsuki; Naohiro Kubota; Toshihiro Shibata, both of Urawa, all of Japan

[73] Assignee: Argus Chemical Corporation, Brooklyn, N.Y.

[21] Appl. No.: 858,599

[22] Filed: Dec. 8, 1977

[30] Foreign Application Priority Data

Dec. 24, 1976 [JP] Japan ............................... 51-155972

[51] Int. Cl.² .......................... C08K 5/13; C08K 5/34; C08K 5/35; C08K 5/53
[52] U.S. Cl. ...................... 260/45.8 NT; 252/400 A; 252/401; 252/403; 252/404; 260/45.7 P; 260/45.8 N; 260/45.8 NZ; 260/45.8 R; 260/45.95 H; 260/45.95 R
[58] Field of Search ... 260/45.7 P, 45.8 R (U.S. only), 260/45.8 NP (U.S. only), 45.8 NZ (U.S. only), 45.7 PT; 252/401, 403

[56] References Cited

U.S. PATENT DOCUMENTS

| | | | |
|---|---|---|---|
| 3,489,722 | 1/1970 | Kotani et al. | 260/45.7 P |
| 3,496,134 | 2/1970 | Di Giaimo | 260/45.9 NC |
| 3,539,531 | 11/1970 | Drake et al. | 260/45.7 P |
| 3,749,694 | 7/1973 | Cantatore et al. | 260/45.7 P |
| 3,790,648 | 2/1974 | Schmidt et al. | 260/970 |
| 3,840,494 | 10/1974 | Murayama et al. | 260/45.8 NP |
| 4,016,168 | 4/1977 | Murayama et al. | 260/45.8 NZ |
| 4,024,103 | 5/1977 | Heinrich et al. | 260/45.7 P |
| 4,035,323 | 7/1977 | Mathis | 260/45.95 R |
| 4,067,931 | 1/1978 | Batorewicz | 260/45.8 R |

Primary Examiner—Howard E. Schain
Assistant Examiner—R. A. White

[57] ABSTRACT

Stabilizers for organic polymeric materials are provided, comprising a 2,2,6,6-tetramethyl-4-piperidyl carboxylic acid ester having the general formula:

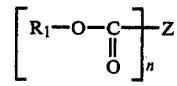

wherein:
$R_1$ is selected from the group consisting of

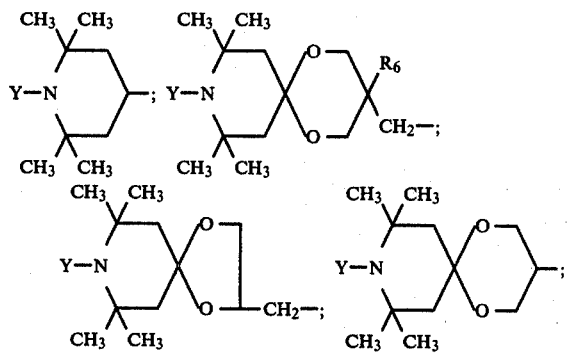

Y is selected from the group consisting of hydrogen and O·;
$R_6$ is lower alkyl having from one to two carbon atoms;
n is selected from the group consisting of 1, 2, 3 and 4; and
Z is an organic radical having a valence from 1 to 4, the valence positions being taken by

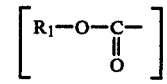

groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, and amino- and hydroxy-substituted such radicals; a phosphonic acid ester, and a phenolic antioxidant.

35 Claims, No Drawings

STABILIZERS FOR SYNTHETIC POLYMERS COMPRISING 2,2,6,6-TETRAMETHYL-4-PIPERIDYL CARBOXYLIC ACID ESTER, PHOSPHONIC ACID ESTER AND PHENOL

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

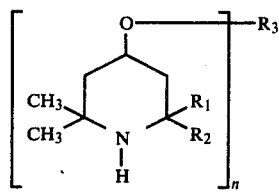

or a salt thereof.

In the above formula:

$R_1$ and $R_2$ which may be the same or different, each are an alkyl group such as methyl, ethyl, isopropyl or dodecyl, or they form, together with the carbon atom to which they are attached, a saturated alicyclic group such as:

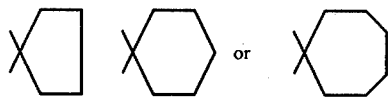

or a group of the formula

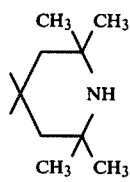

n is an integer of 1 to 3 inclusive; and $R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

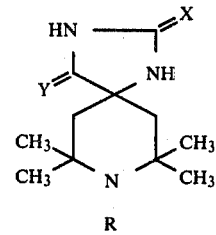

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al in U.S. Pat. No. 3,899,464 patented Aug. 12, 1975 disclose a variation of the piperidino spiro compounds having the formula:

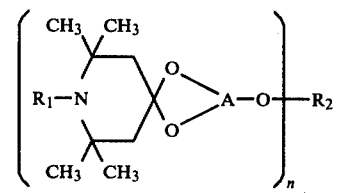

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, n is an integer of 1 to 4;

when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

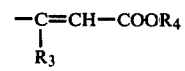

in which $R_3$ represents hydrogen atom, a lower alkyl group or phenyl group and $R_4$ represents an alkyl group;

When n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when n is 3, $R_2$ represents an aromatic triacyl group or a trivalent group from an oxoacid; and when n is 4, $R_2$ represents an aromatic tetraacyl group, and A represents a group

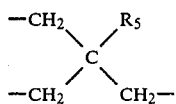

in which

R$_5$ represents hydrogen atom or a lower alkyl group or, when n is 1, R$_5$ may represent together with R$_2$ a group

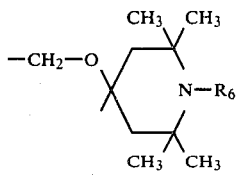

in which

R$_6$ represents the same group as defined in R$_1$ and may be the same or different from R$_1$, or a group

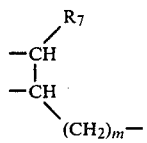

in which m is 1 or 2 and R$_7$ represents hydrogen atom or, when n and m are 1, R$_7$ represents methylene group together with R$_2$.

Murayama et al U.S. Pat. No. 3,840,494, patented Oct. 8, 1974 provides acid esters of 4-piperidinol derivatives having the formula:

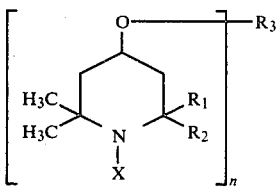

wherein

R$_1$ and R$_2$ may be the same or different and represents an alkyl group of one to four carbon atoms or they may form, together with the carbon atom to which they are attached, a saturated alicyclic group or the group of the formula:

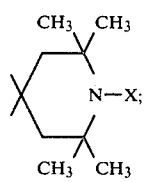

X is hydrogen atom, oxygen free radical (—O.) or an alkyl group of one to four carbon atoms;

n is an integer of 1 through 4 inclusive; and

R$_3$ represents, when n is 1, an acyl group derived from an aliphatic or aromatic monocarboxylic acid, when n is 2, a diacyl group derived from an aliphatic or aromatic dicarboxylic acid or carbonyl group, when n is 3, a triacyl group derived from an aliphatic or aromatic tricarboxylic acid or a trivalent group obtained by eliminating three hydroxyl groups from phosphoric acid, phosphorous acid or boric acid, and when n is 4, a tetraacyl group derived from an aromatic tetracarboxylic acid or a tetravalent group obtained by eliminating four hydroxyl groups from orthosilicic acid.

Murayama et al U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al U.S. Pat. No. 3,941,744 patented Mar. 2, 1976, disclose another variation of the piperidino spiro derivatives having the formula:

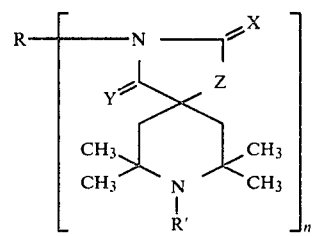

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R" in which R" is hydrogen atom, an alkyl group or a substituted alkyl group;

Z represents oxygen atom or a group of the formula >N—R''' is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group; when n is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl) group, a dialkylene ether group or a diphenylene ether group; when n is 3, an alkanetriyl group, a tris-(acyloxyalkylene) group, an alkane-tris-(oxycarbonylalkyl) group or a group of the group

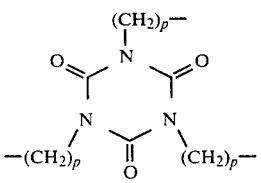

in which p is an integer of 1 through 8 inclusive; and when n is 4, an alkane tetrayl group, a tetrakis-(acyloxyalkylene) group or an alkanetetrakis(oxycarbonylalkyl) group.

Murayama et al U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

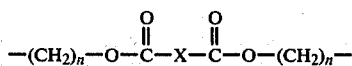

in which n is an integer of 1 or 2 and X is an alkylene group, or o-, m- or p-phenylene group or the carbon atoms of CO groups may be directly joined in the absence of X or a group of the formula:

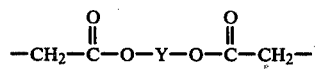

in which

Y is an alkylene group or o-, m- or p-phenylene group.

Ramey et al U.S. Pat. Nos. 3,875,169 patented Apr. 1, 1975 and 3,991,012 patented Nov. 9, 1976 provide bicyclic hindered amines of the formula:

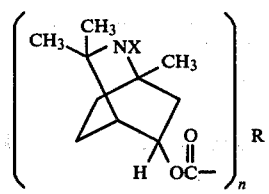

wherein

X is H, O, or OH, n is 1 or 2, and (a) when n is 1, R is straight-or branched-chain alkyl having one to twenty carbon atoms, phenyl or phenyl substituted by one or more lower alkyl groups, and (b) when n is 2, R is straight- or branched-chain alkylene having one to twenty carbon atoms, phenylene or phenylene substituted by one or more lower alkyl groups.

Preferred compounds of formula I are those wherein X is H or O; and n is 1 or 2, and (a) when n is 1, R is n-alkyl having one to twenty atoms, and (b) when n is 2, R is n-alkylene having one to twelve carbon atoms.

Ramey et al U.S. Pat. Nos. 3,907,803 patented Jan. 20, 1976, and 4,001,181 patented Jan. 4, 1977 provide hindered piperidine carboxamide acids and metal salts thereof of the formula:

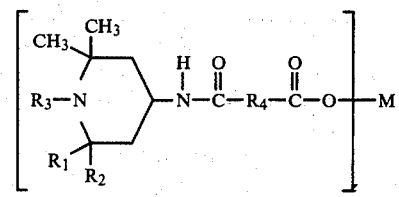

wherein $R_1$ and $R_2$ independently of each other are straight- or branched-chain lower alkyl having one to six carbon atoms, or together with the carbon to which they are bound form a cyclopentyl or cyclohexyl ring, which is unsubstituted or substituted with a methyl group, $R_3$ is hydrogen, alkyl having one to twelve carbon atoms, $\beta$-methoxyethyl alkenyl having three or four carbon atoms, propargyl, benzyl, or alkyl-substututed benzyl, $R_4$ is straight- or branched-chain alkylene having one to eight carbon atoms, phenylene, phenylene substututed with one or more alkyl groups, or the group—$(CH_2)_mY(CH_2)_n$—, wherein Y is oxygen or sulfur and m and n independently of each other are an integer of from 1 to 3, M is hydrogen or a metal selected from the group consisting of barium, nickel, manganese, calcium, zinc, iron, sodium, cobalt, tin, dialkyl tin, and z has a value of from 1 to 4, the value of z being the same as the available valence of M.

Ramey et al U.S. Pat. Nos. 3,899,491, patented Aug. 12, 1975 and 3,920,659, patented Nov. 18, 1975, disclose alkyl alkanoate derivatives of substituted piperazines and substituted piperazinodiones. The substituted piperazines of No. 3,899,491 have the formula:

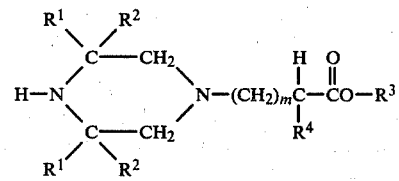

wherein $R^1$ and $R^2$ are methyl or together with the carbon to which they are bound form a mono-cyclic ring system having five or six carbon atoms;

$R^3$ is an alkyl group of from one to twenty atoms;

$R^4$ is hydrogen or methyl, and m is 0 or 1.

The substututed piperazinodiones of No. 3,920,659 have the formula:

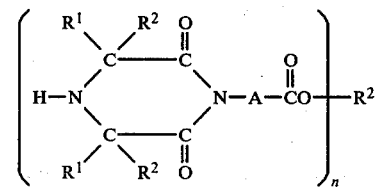

wherein $R^1$ and $R^2$ are independently of each other methyl or ethyl or together with the carbon to which they are found form a cyclopentyl or cyclohexyl ring, which is unsubstituted or substituted with a methyl group;

n is an integer of from 1 to 2;

when n is 1, $R^3$ is an alkyl group of from one to twenty carbon atoms;

when n is 2, $R^3$ is an alkylene group of from two to eight carbon atoms; and

A is a straight or branched chain (lower) alkylene group containing from one to six carbon atoms with the limitation that the terminals of said alkylene group bear only hydrogen or one (lower) alkyl group.

Ramey et al U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

$$\left[ \begin{array}{c} CH_3 \quad CH_3 \\ R_3-N \end{array} \begin{array}{c} O \quad O \\ \parallel \quad \parallel \\ O-C-R_4-C-O \end{array} \right]_z M$$

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to twelve carbon atoms, β-methoxyethyl, alkenyl having three or four carbon atoms, propargyl, benzyl or alkyl-substituted benzyl;

$R_4$ is straight or branched-chain alkylene having five to eight carbon atoms, or the group $(CH_2)_m Y(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al U.S. Pat. No. 3,939,163 patented Feb. 17, 1976 disclose closely similar compounds in which $R_4$ is alkylene having from one to four carbon atoms.

Randell et al U.S. Pat. No. 3,939,170 patented Feb. 17, 1976 disclose dehydropyridinyl sulphides, sulphoxides and sulphones having the formula:

$$\begin{array}{c} CH_3 \quad CH_3 \quad\quad CH_3 \quad CH_3 \\ Y-N \underset{CH_3 \; CH_3}{\diagup} X \underset{CH_3 \; CH_3}{\diagdown} N-Y^1 \end{array}$$

wherein

X is S, SO or $SO_2$ and Y and $Y^1$ are the same or different and each is H, OH, O— or a straight- or branched alkyl residue having from one to four carbon atoms, and salts thereof when Y and $Y^1$ are other than O—.

Randell et al in published patent application No. B408,123 published Apr. 13, 1976 disclose substituted piperidine-4-ols having the formula:

$$\begin{array}{c} H \quad OH \\ H_3C \\ H_3C \end{array} \begin{array}{c} R_1 \\ N \\ | \\ Y \end{array} R_2$$

wherein $R_1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

$$\begin{array}{c} CH_3 \quad CH_3 \\ \diagup \\ \diagdown \\ R_1 \quad R_2 \end{array} N-Y$$

wherein $R_1$ and $R_2$ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group —$CH_2X$ wherein X is the group $$\begin{array}{cc} CH_2-CH- & \text{or} \quad -CH-OH \\ \diagdown \diagup & \quad\quad | \\ O & \quad\quad R_3 \end{array}$$

wherein $R_3$ is hydrogen, a methyl or phenyl residue, the group $$\begin{array}{cc} -C-R_4 & \text{or} \quad -COR_4 \\ \parallel & \quad\quad \parallel \\ O & \quad\quad O \end{array}$$

wherein $R_4$ is an alkyl residue having from one to twenty carbon atoms.

Cook U.S. Pat. No. 3,929,804 patented Dec. 30, 1975 discloses 4-piperidine acetamide compounds having the formula:

$$\left[ \begin{array}{c} R_3 \quad CO-X \\ \diagdown \diagup \\ CH \\ H_3C \\ H_3C \end{array} \begin{array}{c} \\ \\ R_1 \\ N \\ | \\ H \end{array} R_2 \right]_n R_4 \quad\quad I$$

wherein $R_1$ and $R_2$ are the same or different and each is a straight- or branched alkyl residue having from one to twelve carbon atoms, or $R_1$ and $R_2$, together with the carbon atom to which they are attached form a cycloalkyl group having from five to twelve carbon atoms;

$R_3$ is hydrogen, a straight- or branched alkyl residue having from one to four carbon atoms, an aralkyl residue having from seven to nine carbon atoms or a cycloalkyl group having from five or six carbon atoms;

$R_4$ is a metal ion or a hydrocarbyl residue having from two to twenty carbon atoms and being either unsubstituted or substituted by halogen or interrupted by one or more oxygen or sulphur atoms;

X is —O—, —S—, or >$NR_5$, wherein $R_5$ has the same significance as $R_3$; and n is 2, 3 or 4;

as well as salts of the amine function of the compounds of formula I.

Cook U.S. Pat. No. 3,939,168 patented Feb. 17, 1976 discloses closely similar compounds having a Y substituent on the piperidyl nitrogen atom, Y being alkyl, alkenyl, aralkyl or a group

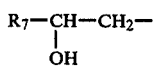

wherein $R_7$ is hydrogen, alkyl or phenyl.

Randell et al U.S. Pat. No. 3,939,170, patented Feb. 17, 1976 provides di-4-(3,4-dehydro-2,2,6,6-tetramethyl piperidinyl) sulphides, sulphoxides and sulphones having the formula:

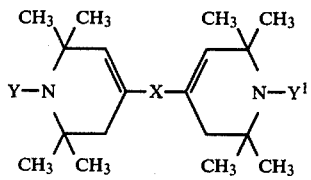

wherein

X is S, SO or $SO_2$ and Y and $Y^1$ are the same or different and each is H, OH, 0° or a straight- or branched-alkyl residue having from one to four carbon atoms, and salts thereof when Y and $Y^1$ are other than 0°.

Preferably X is S.

Smith et al U.S. Pat. No. 3,954,779, patented May 4, 1976 provides 4-(4'-hydroxycyclohexyl)2,2,6,6-tetramethyl piperidines and derivatives thereof having the formula:

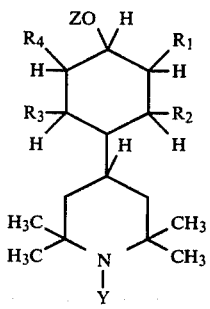

and salts thereof, wherein $R_1$, $R_2$, $R_3$ and $R_4$ are the same or different and each is hydrogen, an alkyl residue having from one to nine carbon atoms, a cycloalkyl residue having from five to fourteen carbon atoms or a cycloalkyl-alkyl residue having from seven to fourteen carbon atoms;

Y is hydrogen;

O an alkyl residue having from one to four carbon atoms, or an aralkyl residue having from seven to twelve carbon atoms; and Z is hydrogen, an unsubstituted or substituted alkyl residue having from one to twenty carbon atoms, an alkenyl or alkynyl residue having from two to twenty carbon atoms, a cycloalkyl residue having from five to twelve carbon atoms, an aralkyl residue having from seven to twelve carbon atoms, an aryl residue having from six to twelve carbon atoms, or the group having the formula:

wherein $Z_1$ has the same significance as Z as hereinbefore defined or $Z_1$ is a group —$NR_5R_6$ wherein $R_5$ is hydrogen or an alkyl residue having from one to four carbon atoms and $R_6$ is hydrogen, an alkyl residue having from one to twenty carbon atoms, a cycloalkyl residue having from five to twelve carbon atoms, an aralkyl residue having from seven to twelve carbon atoms or an aryl residue having from six to twelve carbon atoms.

Cook U.S. Pat. No. 3,959,291, patented May 25, 1976 provides derivatives of substituted 2-piperidinyl-4'-ethyl alcohol having formula:

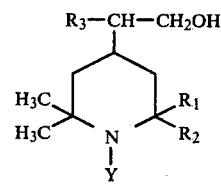

and salts thereof, wherein $R_1$ and $R_2$ are the same or different and each is an alkyl residue having from one to twelve carbon atoms, or $R_1$ and $R_2$, together with the carbon atom to which they are bound, form a cycloalkyl residue having from five to twelve carbon atoms in the ring;

Y is O, hydrogen, a straight- or branched-alkyl residue having from one to twenty carbon atoms, an alkenyl or alkynyl residue having from three to twelve carbon atoms, an aralkyl residue having from seven to twelve carbon atoms or a group having the formula:

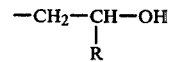

wherein

R is hydrogen, or a methyl or phenyl residue, and $R_3$ is hydrogen, or a straight- or branched-chain alkyl residue having from one to twelve carbon atoms.

Cook U.S. Pat. No. 3,971,795, patented July 27, 1976 provides N-substituted piperidinylidene derivatives having the formula:

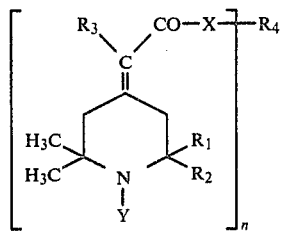

wherein n is 1, 2, 3 or 4,

Y is hydrogen or a straight- or branched-alkyl residue having from one to twelve carbon atoms, an alkenyl residue having from three to twelve carbon atoms or an aralkyl residue having from seven to twelve carbon atoms and $R_1$ and $R_2$ are the same or different and each is a straight- or branched-alkyl residue having from one to twelve carbon atoms, or $R_1$ and $R_2$ together with the carbon atom to which they are attached form a cycloalkyl group having from five to twelve carbon atoms;

$R_3$ is hydrogen, a straight- or branched-alkyl residue having from one to four carbon atoms, an aralkyl residue having from seven to twelve carbon atoms, a cycloalkyl group having five or six carbon atoms;

$R_4$ is a hydrocarbyl residue having from one to twenty carbon atoms being either unsubstituted or substituted by halogen, or interrupted by one or more oxygen or sulphur atoms or $R_4$ is a metal ion, or, when n is 1, $R_4$, in addition, is hydrogen or has the structure;

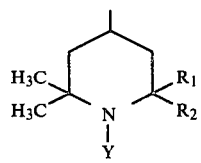

wherein

Y, $R_1$ and $R_2$ have their previous significance,

X is —O—m, —S— or >$NR_5$ wherein $R_5$ has the same significance as $R_3$ or when n is 1 in addition $R_5$ and $R_4$ together with the nitrogen atoms to which they are bound form a heterocyclic residue having from four to ten carbon atoms;

as well as salts of the amine function of the compound of formula I.

Murayama et al U.S. Pat. No. 3,975,357, patented Aug. 17, 1976 provides 1-substituted piperidine derivatives having the formula:

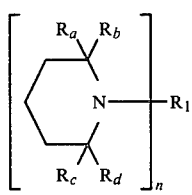

In the above formula, no represents 1 or 2.

$R_1$ represents when n=1, oxyl radical, hydroxy group, an alkyl group, a substituted alkyl group, an alkenyl group, an alkynyl group, an aralkyl group, a substituted aralkyl group or an acyl group, when n=2, an alkylene group (the alkylene chain may optionally be interrupted by an oxygen atom), 2-butenylene group, a group of the formula —CH$_2$COO—R$_7$—O—COCH$_2$— wherein $R_7$ represents an alkylene group or xylylene group, or a group of the formula —CH$_2$CH$_2$—O CO—(—R$_8$—)$_m$CO O—CH$_2$CH$_2$— wherein m represents 0 or 1, $R_8$ represents an alkylene group (the alkylene chain may optionally be interrupted by a sulfur atom), an alkenylene group, phenylene group or 1,4-cyclohexylene group.

$R_a$ and $R_b$ represent methyl group or $R_a$ and $R_b$ together with carbon atom to which they are attached, form cyclohexyl group.

$R_c$ represents methyl group.

$R_d$ represents an alkyl group having one to five carbon atoms.

$R_c$ and $R_d$ together with carbon atom to which they are attached, may form cyclopentyl group, cyclohexyl group, a group of formula:

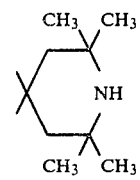

or a group of the formula

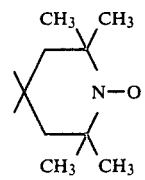

Murayanna U.S. Pat. No. 3,975,462, patented Aug. 17, 1976 provides piperidine-spiro-hydantoin derivatives having the formula:

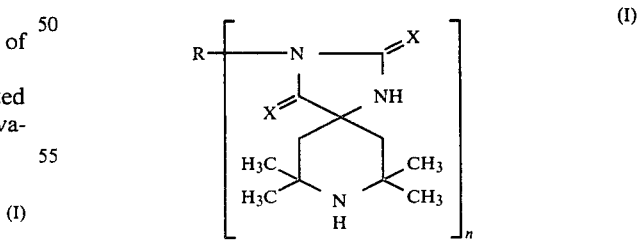

In the above formula (I), X represents oxygen atoms or sulfur atom: n is an integer of 1 to 4 inclusive: and R represents when n is 1, an alkenyl group which may be substituted with halogen, an alkynyl group which may be substituted with phenyl, an aralkyl group which may be substituted with halogen, alkyl of one to four carbon atoms or halomethyl, a hydroxyalkyl group, an alkoxyalkyl group, an alkenyloxyalkyl group, an aryloxyalkyl group, an alkylthioalkyl group, an acyloxyalkyl group, an epoxyalkyl group, an N-alkyl-substituted aminoalkyl group, an alkoxycarbonyl alkyl group, an aliphatic acyl group, an alkoxycarbonyl group, a phosphino group which is substituted with phenoxy or alkoxy or a phospinyl group which is substituted with phenoxy or alkoxy, when n is 2, an alkenylene group of four to eighteen carbon atoms, a dialkylene ether group, an aralkylene group, a bis-(acyloxyalkylene) group, or an alkylene-bis-(oxycarbonylalkyl) group, when n is 3, a tris-(acyloxyalkylene) group, an alkane-tris-(oxycarbonylalkyl) group or a group of the formula:

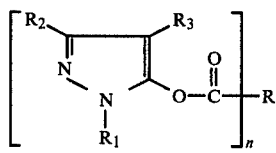

in which
is an integer of 1 to 8 inclusive and p's may be the same or different, and,
when n is 4, a tetrakis (acyloxyalkylene) group.

Ávár et al U.S. Pat. No. 3,976,658, patented Aug. 24, 1976 provides pyrazole derivatives of the formula:

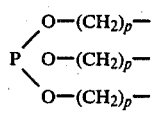    I in which $R_1$ is a $C_{1-22}$ alkyl radical, a $C_{5-12}$ cycloalkyl radical, a $C_{6-12}$ cycloalkylalkyl radical, a $C_{7-12}$ aralkyl radical, of which the alkyl radical and the alkyl moiety of the cycloalkyl-alkyl radical are uninterrupted or interrupted by one or two sulphur atoms or by —COO—, and the aryl nucleus of the aralkyl radical is unsubstituted or substituted by a hydroxyl group and/or 1 or 2 $C_{1-12}$ alkyl radicals, or a phenyl group, unsubstituted or substituted by one or more substituents selected from one or two halogen atoms, a cyano group, a hydroxyl group, 1 or 2 $C_{1-12}$ alkyl radicals, 1 or 2 $C_{1-12}$ alkoxy radicals, a phenyl group and the radicals $R_4$—O— and $R_4$—$SO_2$—, wherein $R_4$ is a phenyl group, unsubstituted or substituted by 1 or 2 $C_{1-8}$ alkyl radicals, $R_2$, independently of $R_1$, has one of the significances of $R_1$, or is a cyano group or the radical —$COOR_5$, wherein $R_5$ is a $C_{1-12}$ alkyl radical, a $C_{5-12}$ cycloalkyl radical, a $C_{6-12}$ cycloalkyl-alkyl radical or a phenyl group, unsubstituted or substituted by a hydroxyl group and/or 1 or 2 $C_{1-8}$ alkyl radicals, $R_3$ is a hydrogen atom or one of the significances of $R_1$, —$COR_1$ or —$COOR_5$, n is 1, 2 or 3, and R, when n is 1, is a phenyl group, unsubstituted or substituted by a total of up to 3 substituents selected from 1 hydroxyl group, one to three halogen atoms, 1 phenyl group, 1 benzyl group, 1 phenoxy group, 1 to 3 alkyl radicals each containing one to eight carbon atoms and the sum of the carbon atoms not exceeding twelve, and 1 to 3 alkoxy radicals each containing one to twenty-two carbon atoms and the sum of the carbon atoms not exceeding twenty-two, or a monovalent naphthalene radical, or a monovalent radical of thiophene, benzothiophene, dibenzothiophene, furan, benzofuran, or dibenzofuran, and when n is 2, is a phenylene group, unsubstituted or substituted by a $C_{1-4}$ alkyl radical and/or a halogen atom, or a divalent naphthalene radical, or a divalent radical or thiophene or dibenzofuran, and when n is 3, is a 1,3,5-trivalent benzene radical.

In accordance with the instant invention, stabilizers for organic polymeric materials are provided, comprising a phosphonate, a phenolic antioxidant, and a 2,2,6,6-tetramethyl-4-piperidyl carboxylic acid ester having the general formula:

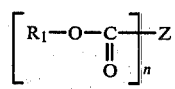

wherein:

$R_1$ is selected from the group consisting of

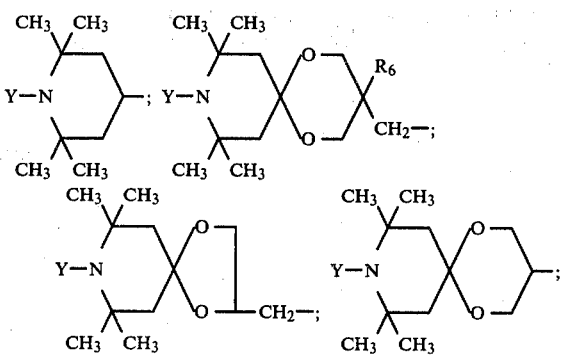

Y is selected from the group consisting of hydrogen and O·;

$R_6$ is lower alkyl having from one to two carbon atoms;

n is selected from the group consisting of 1, 2, 3 and 4; and

Z is an organic radical having a valence from 1 to 4, the valence positions being taken by

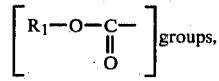 groups, and from one to about twenty carbon atoms, and selected from the group consisting of alkyl, alkenyl, alkylene, alkenylene, alkylidene;aryl, arylene, aralkyl, aralkylene, aralkylidene, alkaryl, alkarylene, alkarylidene; heterocycloalkyl, heterocycloalkylene, heterocycloalkylidene; cycloalkyl, cycloalkyenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, and amino- and hydroxy-substituted such radicals; a phosphonic acid ester, and a phenolic antioxidant.

The $R_6$ alkyl have from one to two carbon atoms, and the Z alkyl and alkenyl have from one to about twenty carbon atoms. Exemplary are methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, octyl, 2-ethylhexyl, nonyl, isononyl, decyl, dodecyl, tridecyl, tetradecyl, hexadecyl, octadecyl, and eicosyl; allyl, butenyl, oleyl, ricinoleyl and linoleyl.

The Z alkylene, alkenylene and alkylidene have from one to twenty carbon atoms, and include saturated and unsaturated methylene, ethylene, propylene, butylene, anylene, hexylene, heptylene, octylene, nonylene, decylene, dodecylene, and octadecylene; vinylene, ethylidene, propylidene butylidene, hexylidene and octylidene.

The Z aryl and arylene have from six to about twenty carbon atoms and include phenyl, naphthyl and phenanthryl; phenylene, naphthylene and phenanthrylene.

The Z aralkyl and aralkylidene have from seven to about twenty carbon atoms, and include phenmethyl, phenethyl, phenpropyl, phenbutyl and naphthethyl.

The Z heterocyclic alkyl, heterocycloalkylene and heterocycloalkylidene have heterocyclic rings with from three to six ring atoms of which from one to three are selected from nitrogen, sulfur and oxygen, and the remainder, if any, are carbon, with one or more alkyl, alkylene or alkylidene substituents, and include piperidine, piperazine, pyrrole, pyrazoline, pyrrollidine, melamine, isocyanuric acid, triazine, pyrazine, pyridone, pyridazine, hexahydropipyrazine, pyrimidine, and hexahydropyrimidine.

The Z cycloalkyl, cycloalkenyl, cycloalkylene, cycloalkenylene and cycloalkylidene, cycloalkalkyl and alkcycloalkyl have from three to twenty carbon atoms and include a cycloaliphatic ring of from three to eight carbon atoms in a monocyclic or bicyclic structure, optionally with an alkyl or alkylene substituent, and include cyclopropyl, cyclobutyl, cyclopentyl, cyclohexyl, cycloheptyl, cyclooctyl, bicyclic cycloheptyl, bicyclic cyclooctyl, methyl cyclopentyl, methyl cyclohexyl, cyclohexylidene, cyclopentylidene, cyclohexylene and cycloheptylene.

Amino-substituted Z radicals include nitrilo trimethylene, ethylene diamine tetramethylene, and nitrilo dimethylene ethylene.

It will be apparent that the Z radical is the residue of a mono or polycarboxylic acid all of whose carboxylic acid groups are esterified by $R_1$ groups, which can be the same or different. The following compounds are exemplary:

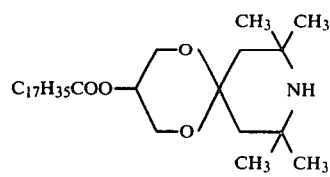

1.

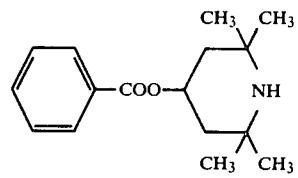

2.

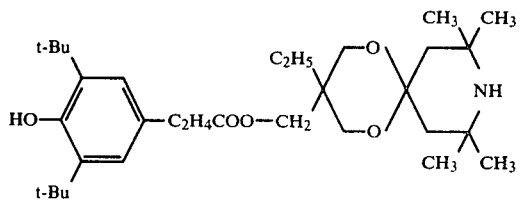

3.

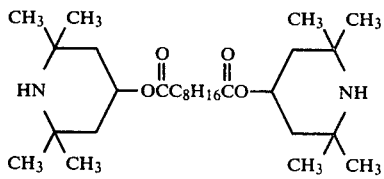

4.

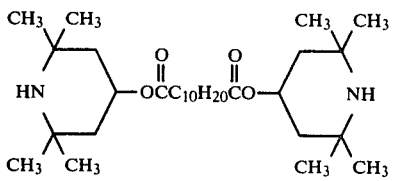

5.

-continued
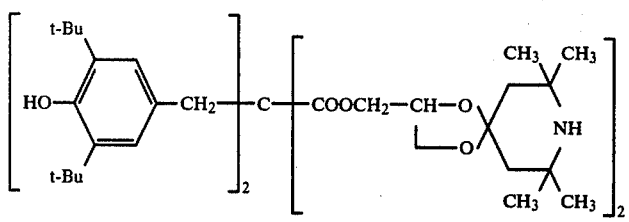
6.
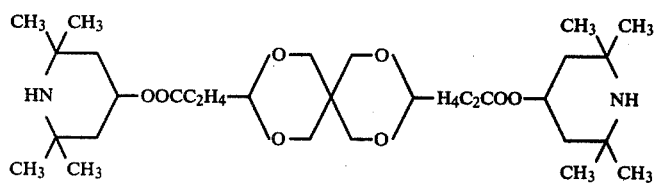
7.
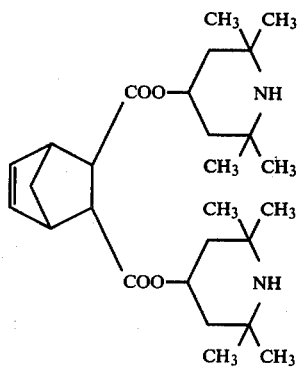
8.
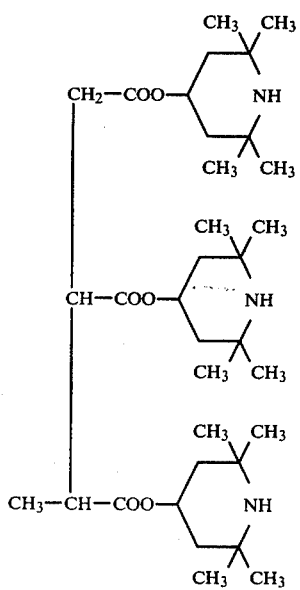
9.

-continued
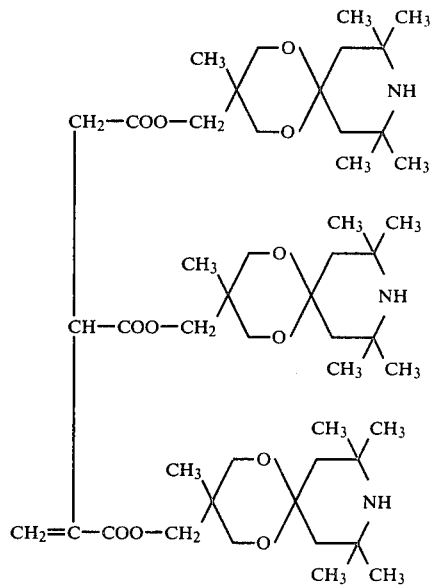
10.
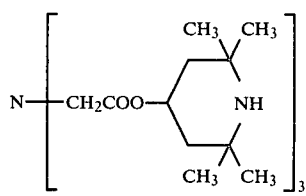
11.
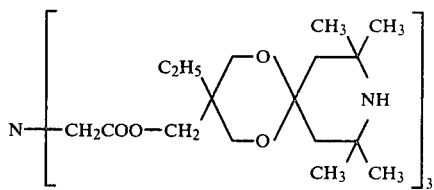
12.
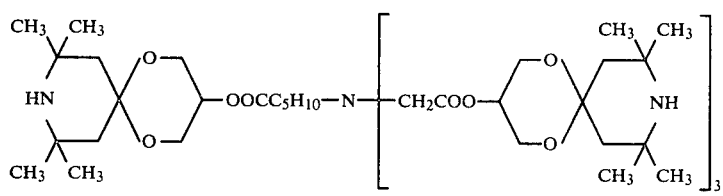
13.
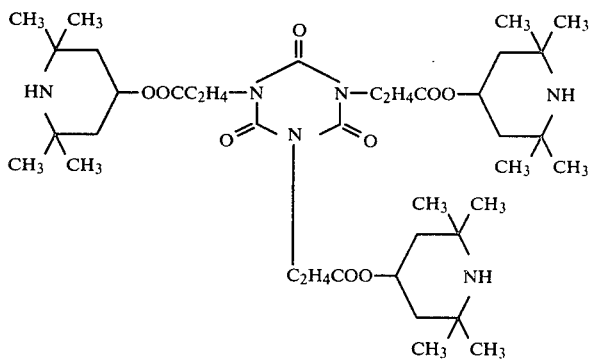
14.

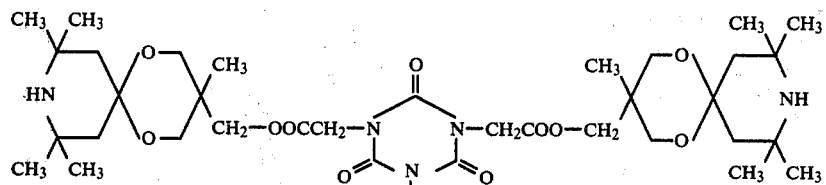
15.
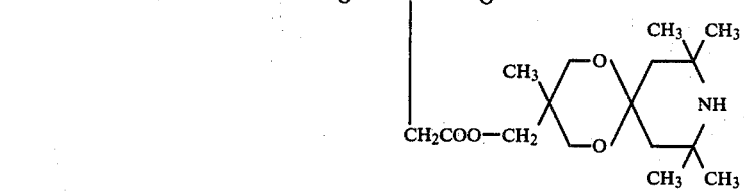
16.
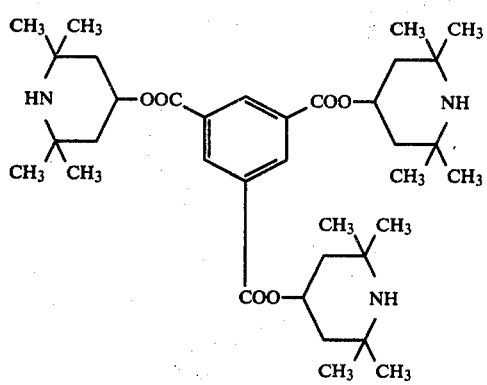
17.
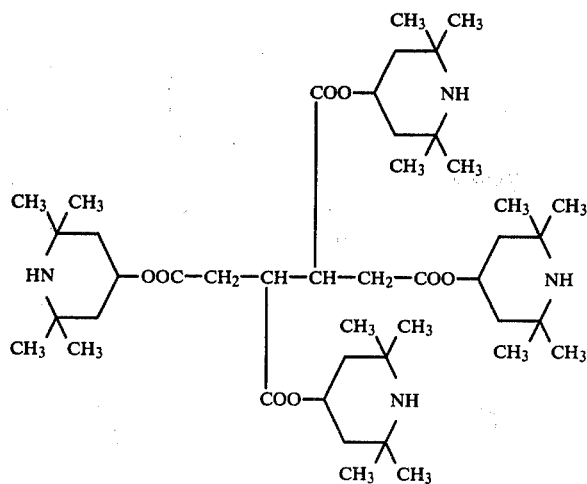

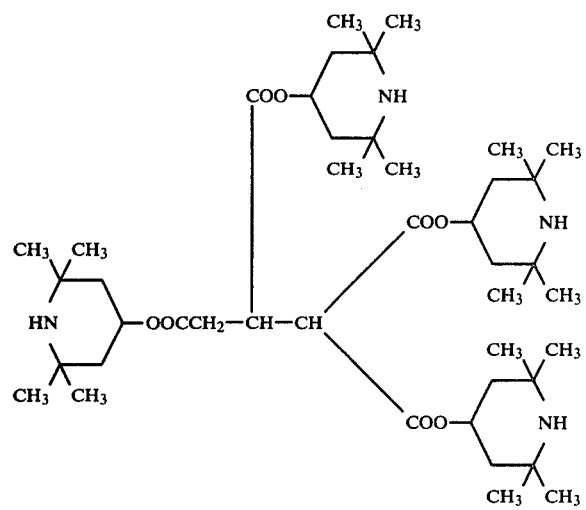
18.
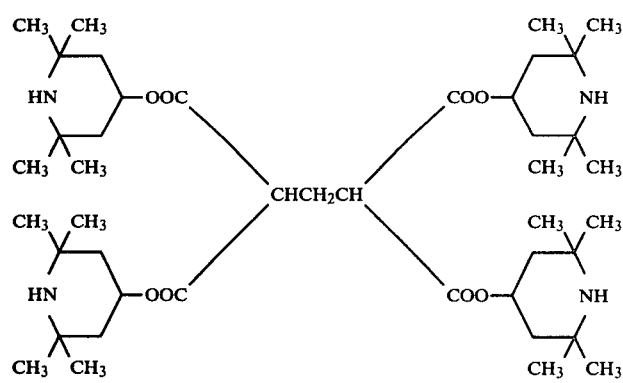
19.
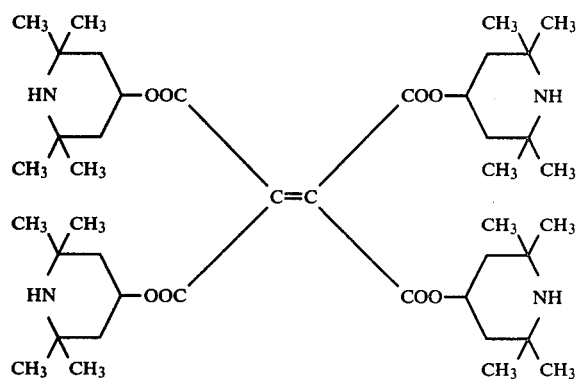
20.
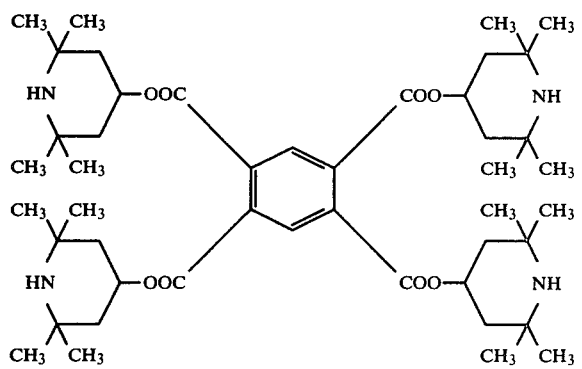
21.

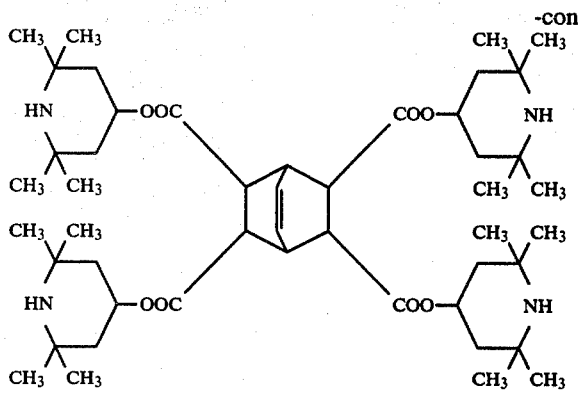 22.

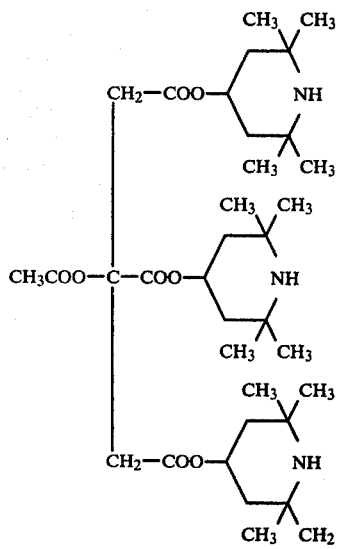 23.

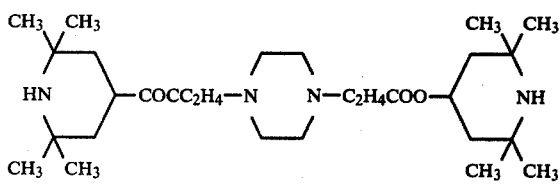 24.

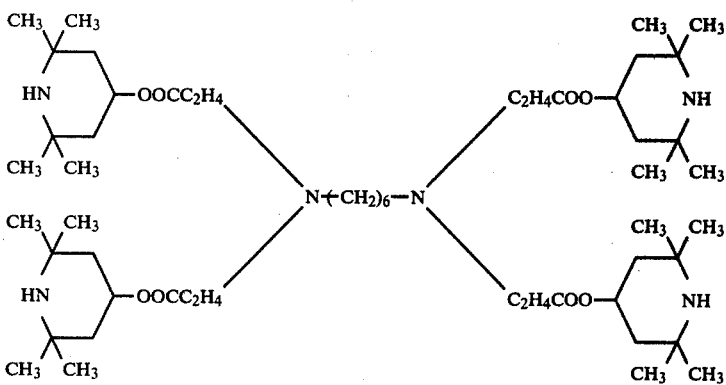 25.

The 2,2,6,6-tetramethyl-4-piperidyl carboxylic acid esters are for the most part known compounds. All are readily prepared using conventional procedures. The starting materials are either available or readily synthesized without difficulty. The corresponding 2,2,6,6-tetramethyl-4-hydroxy piperidine is used as a starting material for the 2,2,6,6-tetramethyl-4-piperidyl group $R_1$. This is reacted in the presence of an organic solvent and an alkali metal alkoxide with one or more free carboxylic acid groups of the corresponding mono or polycarboxylic acid with a Z nucleus containing one or more unesterified carboxylic acid groups. The hydroxy group of the piperidine becomes esterified with the free carboxylic acid groups, forming the 4-piperidinyl carboxylic acid ester of the invention:

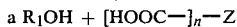

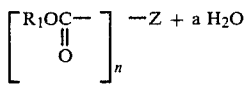

Acids which can be used include acetic, propionic, butyric, valeric, capric, caproic, lauric, myristic, palmitic, and stearic; succinic, glutaric, malic, lactic, adipic, suberic, azelaic, pimelic, citric, trimellitic, pyromellitic, butane-1,2,3,4-tetracarboxylic acid, and cyclopentane tetracarboxylic acid, nitrilotriacetic, ethylene diamine tetraacetic, benzoic, terephthalic, and phthalic.

The stabilizer mixtures of the invention in addition to the 2,2,6,6-tetramethyl-4-piperidyl carboxylic acid ester include a phosphonic acid ester and a phenolic antioxidant. Such combinations are complementary, and impart an enhanced resistance of the polymer to deterioration when exposed to light and/or heat. Such stabilizing effectiveness is enhanced as compared to only one or two components of the three-component stabilizer mixtures of the invention.

The phosphonate esters of the invention have the formula:

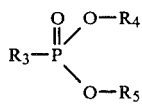

wherein $R_3$, $R_4$ and $R_5$ are selected from the group consisting of alkyl and alkenyl having from about one or two to about thirty carbon atoms; cycloalkyl and cycloalkenyl having from three to about twelve carbon atoms; aryl alkaryl and aralkyl having from six to about thirty carbon atoms, and alkoxy alkylene or polyoxyalkylene in which the alkoxy and alkylene have from one or two to about thirty carbon atoms, and $R_4$ and $R_5$ taken together as an alkylene, cycloalkylene or arylene having from two to about thirty carbon atoms.

The R alkyl can be methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, octyl, 2-ethylhexyl, nonyl, isononyl, decyl, dodecyl, tridecyl, tetradecyl, hexadecyl, octadecyl, and eicosyl; the R alkenyl can be vinyl, allyl, linoleyl, linolenyl, ricinoleyl and oleyl. The aryl, alkaryl or aralkyl can be phenylene, naphthylene, phenmethyl, phenethyl, phenpropyl, phenbutyl, naphthethyl phenethylene, phenpropylene and phenbutylene.

The cycloalkyl and cycloalkylene include a cycloaliphatic ring of from three to eight carbon atoms in a monocyclic or bicyclic structure, optionally with an alkyl or alkylene substituent, and include cyclopropyl, cyclobutyl, cyclopentyl, cyclohexyl, cycloheptyl cyclooctyl, bicyclic cycloheptyl, bicyclic cyclooctyl, methyl cyclopentyl, methyl cyclohexyl, cyclohexylidene, cyclopentylidene, cyclohexylene and cycloheptylene.

The alkoxyalkylene and polyoxyalkylene include ethoxyethylene, methoxyethylene, propoxypropylene, ethoxypropylene, methoxyethylene oxyethylene, ethoxyethylene oxyethylene, propoxypropylene oxypropylene.

Exemplary phosphonate esters include diphenyl benzenephosphonate, di-2-ethylhexyl-2-ethylhexylphosphonate, di-(t-octylphenyl)t-octylphenylphosphonate, diphenyl-2-ethylhexylphosphonate, di-2-ethylhexylisobutylphosphonate, dipropyl-propylphosphonate, di-α-naphthyl-α-naphylphosphonate, dicyclohexylcyclohexylphosphonate, ditolyltolylphosphonate, dibenzyl-benzylphosphonate, di-(nonyl phenyl)-2-ethylhexylphosphonate, di-(dimethylphenyl)-dimethylphenylphosphonate, dimethylbenzylphosphonate, dibutyl-benzylphosphonate, dioctyl-benzylphosphonate, distearyl-benzylphosphonate, butyloctyl-benzylphosphonate, diphenyl-benzylphosphonate, phenyloctyl-benzylphosphonate, neopentyl-benzylphosphonate, di-oleyl-benzylphosphonate, di-(nonylphenyl)-laurylphosphonate, di-(octylphenyl)n-octylphosphonate, distearyl-stearylphosphonate, di-(cyclohexylphenyl)lauryl phosphonate, di-(nonylphenyl)-$C_{12}$-$C_{15}$ mixed alkylphosphonate, di-(octylphenyl)-$C_{20}C_{28}$ mixed alkylphosphonate, neopentyl-laurylphosphonate, neopentyl-stearylphosphonate, di-(butyl-carbitol)-benzylphosphonate and di-(ethyl-cellosolve)-laurylphosphonate.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

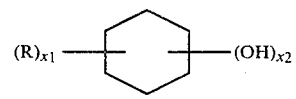

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl (R'C—),
‖
O where R' is aryl, alkyl or cycloalkyl. $x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

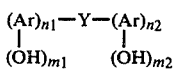

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar-Y-Ar-Y-Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy (R'C—O)
‖
O where R' is aryl, alkyl or cycloalkyl, or thiohydrocarbon groups having from one to about thirty carbon atoms, and carboxyl (—C—O—)
‖
O groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

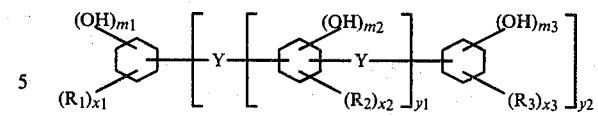

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valency Y groups, connecting more than four Ar groups can also be used. According to their constitution, the Y groups can be assigned to subgenera as follows:

(1) Y groups where at least one carbon in a chain or cyclic arrangement connect the aromatic groups, such as:

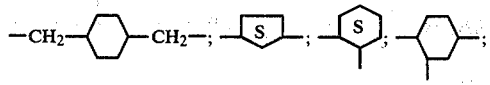

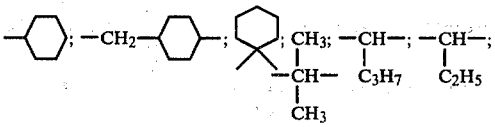

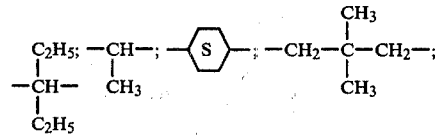

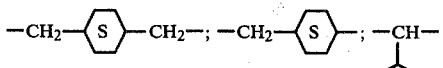

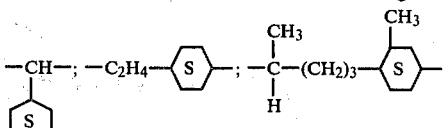

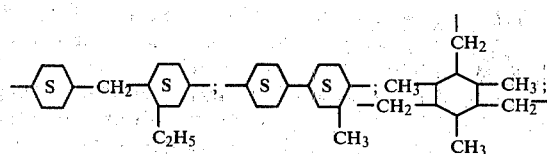

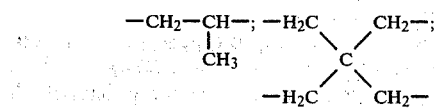

-continued

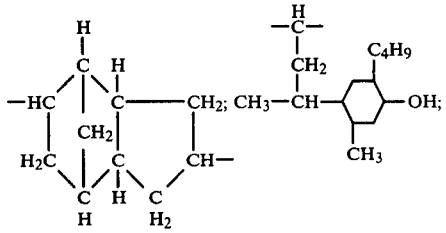

(2) Y groups where only atoms other than carbon link the aromatic rings, such as

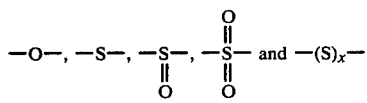

where x is a number from one to ten;

(3) Y groups made up of more than a single atom including both carbon and other atoms linking the aromatic nuclei, such as:

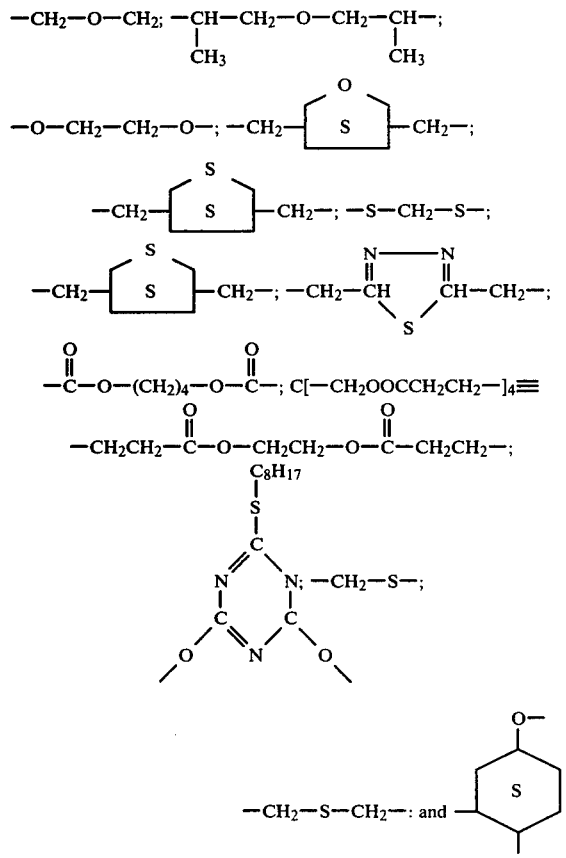

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenyl-phenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxycinnamate, 4-benzyloxy-phenol, p-acetylaminophenol, p-stearyl-aminophenol methyl-p-hydroxybenzoate, p-di-chlorobenzoyl-aminophenol, p-hydroxysalicyl anilide, stearyl-(3,5-di-methyl-4-hydroxy-benzyl) thioglycolate, stearyl-β-(4-hydroxy-3,5-di-t-butylphenyl)propionate, distearyl-3,5-di-t-butyl-4-hydroxybenzylphosphonate, and distearyl (4-hydroxy-3-methyl-5-t-butyl) benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol), 4,4'-benzylidene bis-(2-tertiary-butyl-5-methyl-phenol), 4,4'-cyclohexylidene bis-(2-tertiary-butylphenol) ,2,2'-methylene-bis-(4-methyl-6-(1'-methylcyclohexyl) -phenol),2,6-bis-(2'-hydroxy-3'-tertiary-butyl-5'-methyl-benzyl)-4-methylphenol,4,4'-bis-(2-tertiary-butyl-5-methyl-phenol),2,2'-bis-(4-hydroxy-phenyl)butane, ethylene bis-(p-cresol), 4,4'-oxobis-phenol, 4,4'-oxobis (3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol)2,2'-methylene bis-(4-methyl-6(1'-methyl-cyclohexyl)-phenol), 4,4'cyclohexylene bis-(2-tertiary-butyl-phenol), 2,6-bis-(2'-hydroxy-3'-t-butyl-5'-methyl-benzyl)-4-methyl-phenol, 4,4'-oxobis (naphthalene-1,5-diol), 1,3'-bis-(naphthalene-2,5-diol) propane, and 2,2'-butylene bis-(naphthalene-2,7-diol), (3-methyl-5-tert-butyl-4-hydroxy-phenyl)-4'-hydroxy-phenyl) propane, 2,2'-methylene-bis-(4-methyl-5-isopropylphenol), 2,2'-methylene bis-(5-tert-butyl-4-chlorophenol), (3,5-di-tert-butyl-4-hydroxyphenyl)-(4'-hydroxyphenyl)ethane, (2-hydroxyphenyl)-(3',5'-di-tert-butyl-4',4-hydroxyphenyl) ethane, 2,2'-methylene bis-(4-octylphenol), 4,4'-propylene bis-(2-tert-butylphenol), 2,2'-isobutylene bis-(4-nonyl-phenol), 2,4-bis-(4-hydroxy-3-t-butylphenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxy-phenyl)thiazolo-(5,4-d) thiazole, 2,2'-bis-(3-methyl-5-t-butyl-4-hydroxyphenyl)thiazolo-(5,4-d)-thiazole, 4,4'-bis-(4-hydroxy-phenyl)pentanoic acid oxtadecyl ester, cyclopentylene-4,4'-bis-phenol,2-ethylbutylene-4,4'-bis-phenol, 4,4'-cyclooctylenebis-(2-cyclohexyl-phenol),β,β-thiodiethanol bis-(3-tert-butyl-4-hydroxy-phenoxy acetate), 1,4-butanedio bis-(3-tert-butyl-4-hydroxyphenoxy acetate), pentaerythritoltetra (4-hydroxyphenol propionate), 2,4,4'-tri-hydroxy benzophenone, bis-(2-tert-butyl-3-hydroxy-5-methylphenyl)-sulfide, bis-(2-tert-butyl-4-hydroxy-5-methylphenyl)sulfide, bis-(2-tert-butyl-4-hydroxy-5-methyl-phenyl sulfoxide), bis-(3-ethyl-5-tert-butyl-4-hydroxy benzyl)sulfide, bis-(2-hydroxy-4-methyl-6-tert-butyl phenyl)sulfide, 4,4'-bis-(4-hydroxy-phenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane 1,8-bis-(2-hydroxy-5-methylbenzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butyl phenol)-bis-[3,3-bis-(4-hydroxy-3-t-butylphenyl)butyric acid]glycol ester, 4,4'-butylidene bis-(6-t-butyl-m-cresol), 1,1,3-tris-(2-methyl-4-hydroxy-5-,t-butylphenyl)butane, 1,3,5-tris-(3,5-di-t-butyl-4-hydroxybenzyl)-2,4,6-trimethylbenzene, tetrakis[methylene-3(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-hydroxyphenyl)propionyloxyethyl isocyanurate, 2-octylthio-4,6-di-(4-hydroxy-3,5-di-t-butyl)phenoxy-1,3,5-triazine, 4,4'thiobis(6-t-butyl-m-cresol) and pentaerythritol hydroxyphenyl propionate.

A particularly desirable class of polyhydric polycyclic phenols are the dicyclopentadiene polyphenols, which are of the type:

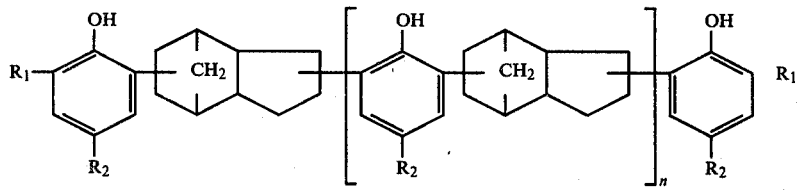

in which $R_1$ and $R_2$ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

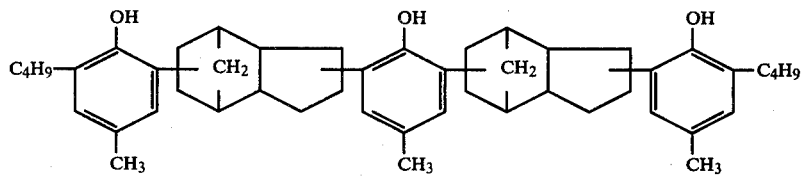

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135 and British Pat. No. 961,504.

In addition to these three ingredients, which are the essential ingredients, the stabilizer compositions of the invention can include other stabilizers conventionally used as heat and/or light stabilizers for synthetic resins, including thiodipropionic acid esters, polyvalent metal salts of organic acids, organic triphosphites and acid phosphites.

The thiodipropionic acid ester has the following formula:

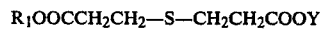

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

wherein

Z is hydrogen, $R_2$ or M;

n is the number of thiodipropionic acid ester units in the chain; and

X is a bivalent hydrocarbon group of the type of $R_1$; the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) $R_1OOCCH_2CH_2SCH_2CH_2COOH$ (b) $R_1OOCCH_2CH_2SCH_2CH_2COOR_2$ (c) $R_1O[OCCH_2CH_2SCH_2CH_2COOX—O]$-$_nOCCH_2CH_2SCH_2CH_2COOZ$ (d) $[R_1OOCCH_2CH_2SCH_2CH_2COO]_2M$

In the above formulae, $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1, 2-propylene

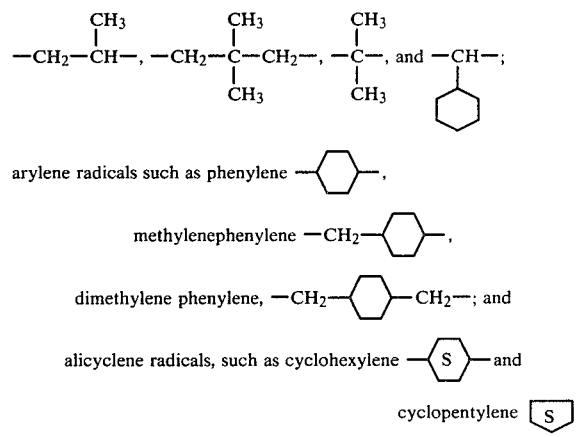

As exemplary of the thiodipropionic acid esters which can be used, there can be mentioned the following: monolauryl thiodipropionic acid, dilauryl thiodipropionate, butyl stearyl thiodipropionate, di-(2-ethylhexyl)-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodiproprionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorous through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

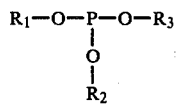

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

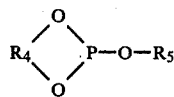

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

$R_5$ is hydrogen or a cation, in the case of the acid phosphites.

Also useful organic triphosphites are mixed heterocyclic-open chain phosphites of the type:

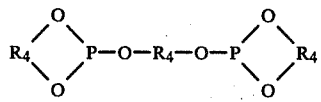

More complex triphosphites are formed from trivalent organic radicals, of the type:

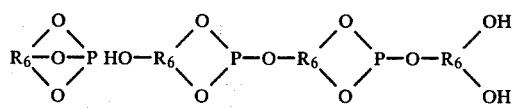

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

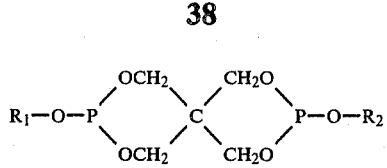

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

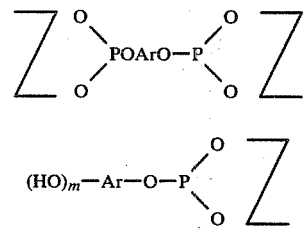

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenylethyl) phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)- undecane (diphenyl-pentaerythritoldiphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane,3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethoxyethyloxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro (5,5)-undecane (where the (polyethoxy) ethyloxy group has an average molecular weight of 350) 3,9-di(methoxy (polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiary butyl-5-methyl-phenol)) isooctyl phosphite, mono (4,4'-thio-bis(2-tertiary-butyl-5-methyl-phenol)) di-phenyl phosphite, tri-(4,4'-n-butylidene-bis(2-tertiary-butyl-5-methyl-phenol)) phosphite, (4,4'-benzylidene-bis(2-tertiary-butyl-5-methyl-phenol)) di-phenyl phosphite, isooctyl 2,2'-bis(-parahydroxyphenyl) propane phosphite, decyl 4,4'-n-butylidene-bis(2-tertiary-butyl-5-methylphenol) phosphite,tri-4,4'thiobis(2-tertiary-butyl-5-methylphenol)phosphite, 2-ethylhexyl-2,2'-methylene-bis(4-methyl-6'-methylcyclohexyl) phenol phosphite, tri(2,2'-bis-(para-hydroxyphenyl) propane) phosphite, tri (4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl 4,4'-n-butylidene-bis(2-tertiary butyl-5-methyl phenyl) diphosphite, tetra-isooctyl 4,4'-thiobis (2-tertiary butyl-5-methyl phenyl) diphosphite, 2,2'-methylene-bis(4-methyl 6,1'-methyl cyclohexyl phenyl) polyphosphite, isooctyl-4,4'-isopropylidene-bis-phenyl-polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiary-butyl-5-methylphenyl) diphosphite, tetratridecyl-4,4'-iso-propylidene bisphenyl diphosphite, hexa-tridecyl butane-1,1,3-tris(2'-methyl-5'-tertiary-butylphenyl-4'-)triphosphite.

Exemplary acid phosphites are di(phenyl) phosphite, monophenyl phosphite, mono-(diphenyl) phosphite, dicresyl phosphite, di-(o-isooctylphenyl) phosphite, di(p-ethylhexylphenyl) phosphite, di(p-t-octylphenyl) phosphite, di(dimethylphenyl) phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl-(n-octylphenyl) phosphite, monocyclohexyl phosphite, dicylohexyl phosphite, di(2-cyclohexyl phenyl) phosphite, di-α-naphthyl phosphite, diphenyl phenyl phosphite, di(diphenyl) phosphite, di(2-phenyl ethyl) phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis (4,4'-thio-bis (2-tertiary-butyl-5-methyl-phenol)) phosphite,(4,4'-thio-bis (2-tertiary-butyl-5-methyl-phenol)) phenyl phosphite, bis (4,4'-n-butylidene-bis (2-tertiary-butyl-5-methyl-phenol)) phosphite, mono (4,4'-benzylidene-bis (2-tertiary-butyl-5-methyl-phenol)) phosphite, mono (2,2'bis-(parahydroxyphenyl) propane) phosphite, mono (4,4'-n-butylidene-bis (-2-tertiary-butyl-5-methyl-phenol) phosphite, bis (4,4'-thiobis (2-tertiary-butyl-5-methylphenol)) phosphite, mono-2-ethylhexyl-mono-2,2'methylene-bis (4-methyl-6,1'methylcyclohexyl) phenol phosphite, bis (2,2'-bis-(para-hydroxyphenyl)propane) phosphite, monoisooctyl mono (4,4'-thio-bis (2-tertiary-butyl-5-methyl-phenol)) phosphite, isooctyl-(2,6-bis (2'-hydroxy-3,5-dinonylbenzyl)-4-nonyl phenyl)) phosphite, tri-tridecyl 4,4'-n-butylidene-bis (2-tertiary-butyl-5-methyl phenyl) diphosphite, triisooctyl 4,4'-thiobis (2-tertiary-butyl-5-methyl phenyl) diphosphite, bis (2,2'-methylene-bis (4-methyl-6,1'-methyl cyclohexyl phenyl)) phosphite, isooctyl-4,4'-isopropylidene-bis-phenyl phosphite, monophenyl mono (2,2'-methylene-bis (4-methyl-6,1'-methyl-cyclohexyl)) triphosphite, di-tridecyl-4,4'-oxydiphenyl diphosphite, di-n-dodecyl-4,4'-n-butylidene bis (2-tertiary-butyl-5-methylphenyl) diphosphite, di-tridecyl-4,4'-isopropylidene bisphenyl diphosphite, tetra-tridecyl butane-1,1,3-tris (2'-methyl-5'-tertiary-butylphenyl-4-) triphosphite.

The 2,2,6,6-tetrasubstituted-4-piperidyl carboxylic acid estertriphosphite-acid phosphite-containing stabilizer compositions of the invention are effective stabilizers to enhance the resistance to deterioration due to heatand/or light of synthetic polymeric materials which are susceptible to such degradation.

The stabilizer systems of the invention are especially effective stabilizers for olefin polymers such as polyethylene, polypropylene, polybutylene, polypentylene, polyisopentylene, and higher polyolefins.

Olefin polymers on heating and working in air undergo degradation, resulting in a loss of melt viscosity.

The stabilizer systems can be employed with any olefin polymer, including low-density polyethylene, high-density polyethylene, polyethylenes prepared by the Ziegler-Natta process, polypropylenes prepared by the Ziegler-Natta process, and by other polymerization methods from propylene, poly (butene-1), poly (pentene-1), poly (3-methylbutene-1) poly (4-methylpentene-1), polystyrene, and mixtures of polyethylene and polypropylene with other compatible polymers, such as mixtures of polyethylene and polypropylene, and copolymers of such olefins, such as copolymers of ethylene, propylene, and butene, with each other and with other copolymerization monomers, which present the instability problem that is resolved by the stabilizer system of the invention. The term "olefin polymer" encompasses both homopolymers and copolymers.

Polypropylene solid polymer can be defined in a manner to differentiate it from other polyolefins as having a density within the range from 0.86 to 0.91, and a melting point above 150° C. The stabilizer system of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade name PRO-FAX, and having a softening or hot-working temperature of about 350° F., is an example of a sterically regular polypropylene polymer.

Mixtures of polypropylene with other compatible polymers and copolymers of propylene with copolymerizable monomers not reactive with the polypropylene stabilizer combination can also be stabilized, for example, mixtures of polyethylene and polypropylene, and copolymers of propylene and ethylene which have a sufficient amount of propylene to present the instability problem that is resolved by the stabilizer combinations of the invention.

The stabilizer combinations are also effective to enhance the resistance to light and/or heat degradation of polystyrene; polydienes, such as polybutadiene and polyisoprene; and copolymers of olefins and dienes with other ethylenically and acetylenically unsaturated monomers, such as ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsilon-caprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

A sufficient amount of the stabilizer combination is used to improve the resistance of the synthetic polymer to deterioration in physical properties, including, for example, discoloration, reduction in melt viscosity and embrittlement, under the conditions to which the polymer will be subjected. Very small amounts are usually adequate. Amounts within the range from about 0.001 to about 15% total stabilizers by weight of the polymer are satisfactory. Preferably, from 0.05 to 5% is employed, for optimum stabilization.

Inasmuch as all components are solids, the stabilizer systems of the invention are readily rendered in solid particulate form, comprising a blend of (a) a 2,2,6,6-tetramethyl-4-piperidyl carboxylic acid ester in an amount from about 90 to about 35 parts by weight;

(b) a phenolic antioxidant in an amount of from about 10 to about 35 parts by weight; and (c) a phosphonic acid ester in an amount of from about 10 to about 35 parts by weight.

The stabilizer compositions of the invention can be employed as the sole stabilizer or in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flameproofing agents, pigments and fillers, can be employed.

Preferably, the stabilizer system is added to the synthetic polymer in an amount to provide in the polymer from about 0.01 to about 5% of the 2,2,6,6-tetramethyl-4-piperidyl carboxylic acid ester, from about 0.001 to about 5% of the phenolic antioxidant and from about 0.001 to about 5% of the phosphonate ester. More than 5% of the phenol and more than 15% of the total stabilizers may evidence a lessened stabilizing effect or even a depressing effect on stabilization at high temperatures above 275° C.

The stabilizer combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The following Examples illustrate preferred stabilizer systems of the invention. EXAMPLES 1 to 5

A group of polyvinyl chloride resin compositions was prepared having the following formulation:

| Ingredient | Parts by Weight |
| --- | --- |
| Polyvinyl chloride | 100 |
| Dioctylphthalate | 50 |
| Ca stearate | 1.0 |
| Zn stearate | 0.1 |
| 2,6-Di-tertiary-butyl-p-cresol | 0.5 |
| Piperidyl ester as shown in Table I | 0.5 |
| Phosphonate ester as shown in Table I | 0.5 |

This formulation was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light (denoted as Hours to Failure in Table I).

Heat stability was evaluated in a Geer forced air oven at 175° C., and the time to failure in minutes noted (denoted as Minutes to Failure in Table I).

This test was carried out for the stabilizers in accordance with the invention having the formulae indicated in Table I. The following results were obtained:

TABLE I

| Example No. | Piperidyl ester | Phosphonate ester | Hours to Failure | Minutes to Failure |
|---|---|---|---|---|
| Control 1 | None | None | 290 | 60 |
| Control 2 | None | Diphenyl benzene phosphonate | 320 | 60 |
| Control 3 | [bis(2,2,6,6-tetramethyl-4-piperidyl) dodecanedioate: HN-piperidyl-O-OC-C₁₀H₂₀-CO-O-piperidyl-NH] | None | 550 | 60 |
| 1 | [2,2,6,6-tetramethyl-4-piperidyl benzoate: C₆H₅-COO-piperidyl-NH] | Diphenyl benzene phosphonate | 740 | 90 |
| 2 | [bis(2,2,6,6-tetramethyl-4-piperidyl) dodecanedioate: HN-piperidyl-O-OC-C₁₀H₂₀-CO-O-piperidyl-NH] | Diphenyl 2-ethylhexyl phosphonate | 800 | 120 |
| 3 | [tris-piperidyl ester containing three 2,2,6,6-tetramethyl-4-piperidyl-spiro-dioxane groups linked via CH₂-COO-CH₂, CH-COO-CH₂, and CH₂=C-COO-CH₂] | Dicyclohexyl cyclohexyl-phosphonate | 850 | 105 |
| 4 | [tris(2,2,6,6-tetramethyl-4-piperidyl) ester of tris(carboxyethyl)isocyanurate: HN-piperidyl-OOC-C₂H₄-N(triazinetrione)-C₂H₄-COO-piperidyl-NH, with third N-C₂H₄-COO-piperidyl-NH branch] | Dibutyl benzyl phosphonate | 690 | 120 |

TABLE I-continued

| Example No. | Piperidyl ester | Phosphonate ester | Hours to Failure | Minutes to Failure |
|---|---|---|---|---|
| 5 | [Structure: norbornene core with four 2,2,6,6-tetramethyl-4-piperidyl ester groups attached via COO linkages] | Neopentyl benzyl phosphonate | 870 | 120 |

It is apparent that the stabilizer compositions in accordance with the invention are far superior to the controls containing no stabilizer or only one or two of the three-component stabilizer of the invention.

EXAMPLES 6 to 9

Polypropylene compositions were prepared using stabilizers of the invention and having the following formulation:

| Ingredient | Parts by Weight |
|---|---|
| Polypropylene | 100 |
| Stearyl β-(4-hydroxy-3,5-di-tert-butyl-phenyl) propionate | 0.3 |
| Piperidyl ester as shown in Table II | 0.3 |
| Phosphonate ester as shown in Table II | 0.1 |

The composition was thoroughly blended in a Brabender Plastograph, and then compression-molded to form sheets 0.5 mm thick.

Pieces 2.5 cm² were cut off from the sheets and exposed to ultraviolet light in a Weather-O-Meter.

Heat stability was evaluated in an air circulating oven at 160° C.

In each test, the time in hours required for the sheet to develop a noticeable discoloration and/or embrittlement was noted as the hours to failure.

The results obtained are shown in Table II.

TABLE II

| Example No. | Piperidyl ester | Phosphonate ester | Hours to Failure (Weather-O-Meter) | (Oven) |
|---|---|---|---|---|
| Control 1 | None | Di-(octylphenyl)octylphosphonate | 280 | 830 |
| Control 2 | 2-Hydroxy-4-methoxybenzophenone | Di-(octylphenyl)octylphosphonate | 370 | 750 |

TABLE II-continued
| Example No. | Piperidyl ester | Phosphonate ester | Hours to Failure (Weather-O-Meter) | (Oven) |
|---|---|---|---|---|
| Control 3 | 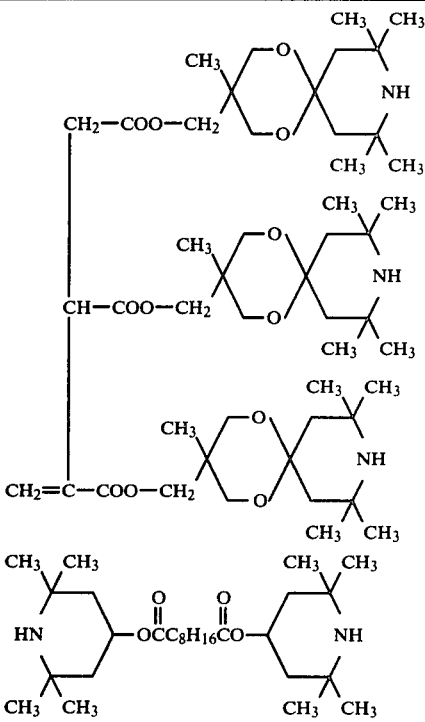 | Tris-(nonyl-phenyl) phosphite | 350 | 850 |
| 6 | | Di-(octyl-phenyl)octyl phosphonate | 850 | 920 |
| 7 | 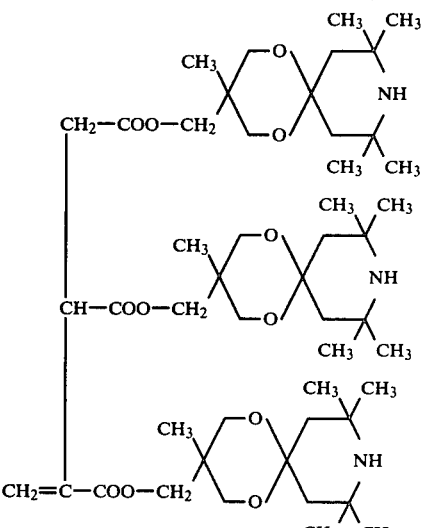 | Ditolyl tolyl-phosphonate | 780 | 980 |
| 8 | 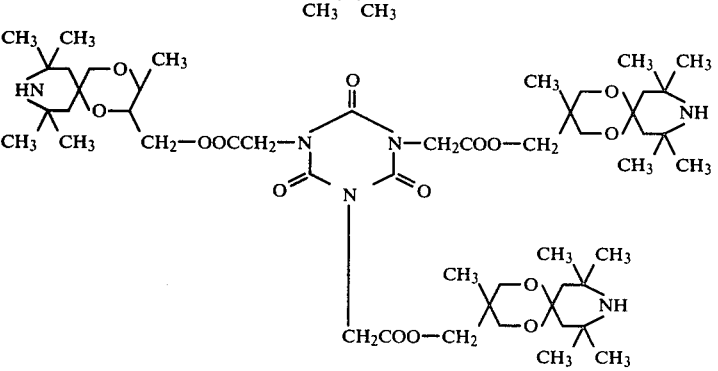 | Butyl-octyl-benzyl phosphonate | 910 | 1110 |

TABLE II-continued

| Example No. | Piperidyl ester | Phosphonate ester | Hours to Failure (Weather-O-Meter) | (Oven) |
|---|---|---|---|---|
| 9 | [Structure: bis-piperidyl ester with C=C center, four 2,2,6,6-tetramethylpiperidyl-OOC groups attached to C=C] | Neopentyl stearyl phosphonate | 880 | 1040 |

It is apparent from the above results that the compounds of the invention are superior stabilizers in enhancing the resistance of the polypropylene polymer composition to deterioration in the presence of ultraviolet light.

EXAMPLES 10 to 14

Ethylene-vinyl acetate copolymer compositions were prepared using stabilizers of the invention and having the following formulation:

| Ingredient | Parts by Weight |
|---|---|
| Ethylene-vinyl acetate copolymer | 100 |
| Tetrakis-(methylene-3-(3',5'-di-t-butyl-4-hydroxyphenyl) propionate) methane | 0.1 |
| Piperidyl ester as shown in Table III | 0.25 |
| Phosphonate ester as shown in Table III | 0.25 |

The stabilizer was blended with the polymer on a two-roll mill at 120° C., and sheets 1 mm thick were then compression molded at 120° C. from the resulting blend. Pieces 2.5 cm$^2$ were cut off from the sheets and exposed to ultraviolet light in a Weather-O-Meter for 500 hours. At the start and at the conclusion of the test, the tensile strength of the sheet samples was determined.

Heat stability was evaluated in a Geer forced air oven at 175° C. Initial color was determined using a Hunter color difference meter.

The results are given in Table III as % retention of the initially determined tensile strength, minutes to failure in the oven test, and initial yellowness:

TABLE III

| Example No. | Piperidyl ester | Phosphonate ester | % Retention of Tensile Strength | Oven Heating Minutes to Color Failure | |
|---|---|---|---|---|---|
| | | | | Oven | Color |
| Control 1 | None | None | 50 | 60 | 30 |
| Control 2 | None | Neopentyl lauryl phosphonate | 58 | 75 | 20 |
| Control 3 | [Structure: bis-(2,2,6,6-tetramethylpiperidyl) ester linked via —OOCC$_2$H$_4$—[spiro bis-dioxane]—H$_4$C$_2$COO—] | None | 66 | 60 | 27 |
| 10 | [Structure: C$_{17}$H$_{35}$COO—[dioxa-spiro]—piperidyl NH] | Diphenyl phenyl phosphonate | 78 | 105 | 9 |

TABLE III-continued

| Example No. | Piperidyl ester | Phosphonate ester | % Retention of Tensile Strength | Oven Heating Minutes to Color Failure | |
|---|---|---|---|---|---|
| | | | | Oven | Color |
| 11 | (structure) | Diphenyl 2-ethylhexyl-phosphonate | 82 | 115 | 10 |
| 12 | (structure) | Dibenzyl benzyl phosphonate | 80 | 105 | 12 |
| 13 | (structure) | Dihenyl vinyl phosphonate | 78 | 110 | 11 |
| 14 | (structure) | Neopentyl lauryl phosphonate | 81 | 120 | 10 |

It is apparent from the results that the stabilizer compositions in accordance with the invention are superior in enhancing the resistance of the ethylene-vinyl acetate copolymer to deterioration in the presence of ultraviolet light, and at elevated temperature.

EXAMPLES 15 to 20

High density polyethylene compositions were prepared using stabilizers of the invention, and having the following formulation:

| Ingredient | Parts by Weight |
|---|---|
| High-density polyethylene | 100 |
| Calcium stearate | 1 |
| Thiodiglycol bis-(4-hydroxy-3,5-di-t-butylphenyl propionate) | 0.2 |
| Piperidyl ester as shown in Table IV | 0.25 |
| Phosphonate ester as shown in Table IV | 0.2 |

The stabilizer was blended with the polymer on a two-roll mill and sheets 0.5 mm thick were prepared by compression molding of the blend. Pieces 2.5 cm$^2$ were cut off from the sheets, and exposed in a Weather-O-Meter to ultraviolet light.

Heat stability was evaluated in a Geer oven at 150° C.

In each case the time in hours when degradation set in, as determined by a significant discoloration and/or embrittlement, was noted as hours to failure, and the results are reported in Table IV:

| Ex. No. | Piperidyl ester | Phosphonate ester | Hours to Failure (Weather-O-Meter) | (Oven) |
|---|---|---|---|---|
| Control 1 | None | Di-(octylphenyl)octyl-phenyl phosphonate | 370 | 150 |
| Control 2 | [(t-Bu)₂(HO)C₆H₂–]₂–C[–COOCH₂–CH–O–CH₂–O–C(CH₃)₂–CH₂–NH–CH₂–C(CH₃)₂]₂ (hindered phenol bis-piperidyl spiro ester) | None | 600 | 120 |
| Control 3 | 2-(2'-hydroxy-5'-methylphenyl)benzotriazole | Di-(cyclohexylphenyl) lauryl phosphonate | 580 | 410 |
| 15 | (3,5-di-t-Bu-4-HO-C₆H₂)–C₂H₄COO–CH₂–[spiro-1,3-dioxane with C₂H₅ and 2,2,6,6-tetramethylpiperidine-NH] | Dioleyl benzil phosphonate | 810 | 580 |
| 16 | [(t-Bu)₂(HO)C₆H₂–CH₂–]₂–C[–COOCH₂–CH–O–CH₂–O–C(CH₃)₂–CH₂–NH–CH₂–C(CH₃)₂]₂ | Dicyclohexyl cyclohexyl phosphonate | 970 | 520 |
| 17 | N[–CH₂COO–CH₂–(spiro-1,3-dioxane with C₂H₅ and 2,2,6,6-tetramethylpiperidine-NH)]₃ | Di-(octylphenyl) octyl-phenyl phosphonate | 880 | 510 |
| 18 | CH[–CH(COO-2,2,6,6-tetramethylpiperidin-4-yl)–CH₂(COO-2,2,6,6-tetramethylpiperidin-4-yl)] tetraester with four 2,2,6,6-tetramethylpiperidin-4-yl groups | Di-(α-naphthyl) α-naphthyl-phosphonate | 1020 | 570 |

-continued

| Ex. No. | Piperidyl ester | Phosphonate ester | Hours to Failure (Weather-O-Meter) | (Oven) |
|---|---|---|---|---|
| 19 | CH₂—COO—[2,2,6,6-tetramethylpiperidyl], CH₃COO—C—COO—[2,2,6,6-tetramethylpiperidyl], 2—COO—[2,2,6,6-tetramethylpiperidyl] | Di-(cyclohexylphenyl) lauryl phosphonate | 850 | 600 |
| 20 | HN-[2,2,6,6-tetramethylpiperidyl]—OOCC₂H₄— / N—(CH₂)₆—N \ HN-[2,2,6,6-tetramethylpiperidyl]—OOCC₂H₄— and C₂H₄COO—[2,2,6,6-tetramethylpiperidyl] branches | Di-(nonylphenyl) nonylphenyl phosphonate | 920 | 610 |

The stabilizers of the invention are clearly superior to the controls in enhancing resistance of the polyethylene to degradation under ultraviolet light and at elevated temperature.

EXAMPLES 21 to 30

Acrylonitrile-butadiene-styrene terpolymer resin compositions were prepared using stabilizers of the invention and having the following formulation:

| Ingredient | Parts by Weight |
|---|---|
| Acrylonitrile-butadiene-styrene terpolymer | 100 |
| 4,4'-n-Butylidene bis-(2-t-butyl-5-methylphenol) | 0.1 |
| Zinc stearate | 0.5 |
| Piperidyl ester as shown in Table V | 0.3 |
| Phosphonate ester as shown in Table V | 0.2 |

The stabilizer was blended with the resin on a two-roll mill, and sheets 2.5 mm thick were prepared by compression molding of the resulting blend. Pieces 2.5 cm² were cut off from the sheets, and subjected to ultraviolet light in a Weather-O-Meter for 800 hours. Tensile strength before and after the test exposure was determined, and the results reported as the percent of tensile strength retained, at the end of this time, in Table V.

Heat stability was evaluated by heating at 210° C. under a stress of 50 kg/cm² for ten minutes, and then noting color on a scale from 1 to 10 in which 10 is brown and 1 is white. Color is reported in Table V.

TABLE V

| Example No. | Piperidyl ester | Phosphonate ester | % Retention of Tensile Strength | Color of sheet After Heating |
|---|---|---|---|---|
| Control 1 | None | None | 40 | 9 |

TABLE V-continued

| Example No. | Piperidyl ester | Phosphonate ester | % Retention of Tensile Strength | Color of sheet After Heating |
|---|---|---|---|---|
| Control 2 | [N—CH₂COO—piperidyl]₃ structure | None | 53 | 9 |
| Control 3 | None | Di-(octylphenyl)benzyl phosphonate | 45 | 6 |
| 21 | bis-piperidyl sebacate structure (HN-piperidyl—OOC-C₈H₁₆-COO—piperidyl-NH) | Di-(2-ethylhexyl)benzyl phosphonate | 76 | 2 |
| 22 | norbornene dicarboxylic acid bis(piperidyl) ester | Dilauryl lauryl phosphonate | 82 | 3 |
| 23 | [N—CH₂COO—piperidyl]₃ structure | Diethyl phenyl phosphonate | 80 | 3 |
| 24 | tetra(piperidyl) ester structure (HN-piperidyl—OOC—CH₂—CH—CH—CH₂—COO—piperidyl-NH, with two additional COO-piperidyl branches) | Di-(octylphenyl)benzyl phosphonate | 83 | 2 |

TABLE V-continued

| Example No. | Piperidyl ester | Phosphonate ester | % Retention of Tensile Strength | Color of sheet After Heating |
|---|---|---|---|---|
| 25 | [tetra-substituted benzene with four 2,2,6,6-tetramethylpiperidyl ester groups] | Dipropyl propyl phosphonate | 81 | 3 |

It is apparent from the data that the stabilizers of the invention are superior to the controls.

EXAMPLES 27 to 36

Polyamide resin compositions were prepared using stabilizers of the invention and having the following formulation:

| Ingredient | Parts by Weight |
|---|---|
| Poly-epsilon-caprolactam | 100 |
| Tetrakis-(methylene-3-(3,5-di-t-butyl-4-hydroxyphenyl) propionate) methane | 0.1 |
| Piperidyl ester as shown in Table VI | 0.2 |
| Phosphonate ester as shown in Table VI | 0.1 |

The stabilizer was blended with the finely powdered poly-epsiloncaprolactam in a ball mill for fifteen minutes, and the resulting powder was then compression-molded at 250° C. to form sheets 0.5 mm thick. Pieces 2.5 cm² were cut out from the sheets, and exposed to ultraviolet light in a Weather-O-Meter for 120 hours. At the conclusion of the test period, the color of the sheets was noted. The color was also noted after heating at 225° C. for thirty minutes in a Geer oven.

TABLE VI

| Example No. | Piperidyl ester | Phosphonate ester | Color of Sheet after Irradiation | Color of Sheet after Heating |
|---|---|---|---|---|
| Control 1 | None | None | Dark brown | Dark brown |
| Control 2 | [2,2,6,6-tetramethylpiperidyl ester structure] | None | Yellow | Dark brown |
| 27 | [bis(t-Bu-hydroxyphenyl) structure with piperidyl ester groups] | Ditolyl tolyl phosphonate | Light Yellow | Light yellow |

TABLE VI-continued

| Example No. | Piperidyl ester | Phosphonate ester | Color of Sheet after Irradiation | Color of Sheet after Heating |
|---|---|---|---|---|
| 28 | (structure: CH₂—COO, CH—COO, CH₃—CH—COO each linked to 2,2,6,6-tetramethylpiperidinyl groups) | Di-(isooctyl)-benzyl phosphonate | Pale yellow | Light yellow |
| 29 | (structure: central CH—CH(CH₂—COO—piperidyl)(COO—piperidyl) with four 2,2,6,6-tetramethylpiperidinyl ester groups) | Di-(octyl)-octyl phosphonate | Pale yellow | Light yellow |
| 30 | (structure: 1,2,4,5-benzene tetracarboxylic acid tetra-(2,2,6,6-tetramethylpiperidinyl) ester) | Di-(oleyl) phenyl phosphonate | Pale yellow | Pale yellow |

It is apparent that the stabilizers of the invention are effective ultraviolet light and heat stabilizers for polyamide resins.

EXAMPLE 31 to 35

Polybutylene terephthalate resin compositions were prepared having the following compositions:

| Ingredient | Parts by Weight |
|---|---|
| Polybutylene terephthalate | 100 |
| 1,3,5-tris-(3,5-di-t-butyl-4-hydroxy benzyl)-2,4,6-trimethyl benzene | 0.1 |
| Piperidyl ester as shown in Table VII | 0.4 |
| Phosphonate ester as shown in Table VII | 0.5 |

The compositions were extruded to form pellets, and then test pieces were molded from the pellets by injection molding at 270° C. Test pieces were irradiated with ultraviolet light for 500 hours in a Weather-O-Meter. Other test pieces were heated in an air oven at 150° C.

for 240 hours to determine heat stability. Tensile strength before and after the test was determined, and the percent tensile strength retained in each test is given in Table VII:

TABLE VII

| Ex. No. | Piperidyl ester | Phosphonate ester | % Retention of Tensile Strength (irradiation) | (heating) |
|---|---|---|---|---|
| Control 1 | None | None | 47 | 62 |
| Control 2 | None | Di(octy)pheny)benzyl phosphonate | 52 | 71 |
| 31 | phenyl-COO-(2,2,6,6-tetramethylpiperidin-4-yl) | Diphenyl phenyl phosphonate | 81 | 83 |
| 32 | tri(2,2,6,6-tetramethylpiperidin-4-yl) ester of propane-1,2,3-tricarboxylic acid derivative (CH₂—COO—, CH—COO—, CH₃—CH—COO— each to 2,2,6,6-tetramethylpiperidine) | Di(octylphenyl)benzyl phosphonate | 86 | 84 |
| 33 | tris[(2,2,6,6-tetramethylpiperidinyl)-dioxaspiro-CH₃-CH₂—OOCCH₂—N] isocyanurate derivative | Di(octylphenyl)benzyl phosphonate | 83 | 86 |

TABLE VII-continued

| Ex. No. | Piperidyl ester | Phosphonate ester | % Retention of Tensile Strength (irradiation) | (heating) |
|---|---|---|---|---|
| 34 | 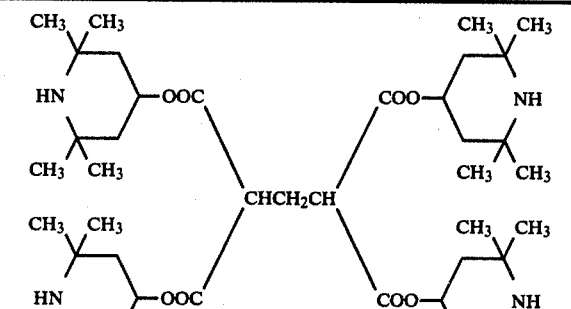 | Diphenyl vinyl phosphonate | 84 | 83 |
| 35 | 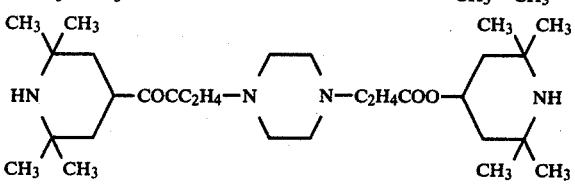 | Diphenyl octyl phosphonate | 89 | 80 |

It is apparent that the stabilizers of the invention are effective ultraviolet light and heat stabilizers for polyester resins.

EXAMPLES 36 to 40

Polypropylene compositions were prepared using stabilizer systems of the invention and having the following formulation:

| Ingredient | Parts by Weight |
|---|---|
| Polypropylene | 100 |
| 1,3,5-tris-(3,5-di-t-butyl-4-hydroxybenzyl) isocyanurate | 0.1 |
| Piperidyl ester as shown in Table VIII | 0.3 |
| Phosphonate ester as shown in Table VIII | 0.2 |

The above ingredients were thoroughly blended on a Brabender Plastograph and then compression-molded to form a sheet 0.5 mm thick. Pieces 2.5 cm² were cut off from the sheets, and then resistance to gas staining with $NO_x$ gas was measured by determining the yellowness of the sheet after immersion in an $NO_x$ gas atmosphere for 72 hours at room temperature by a Hunter calorimeter, comparing this to initial color, and reporting the yellowness as percent increase in yellowness from the initial color.

The results are shown in Table VIII:

TABLE VIII

| Example No. | Piperidyl ester | Phosphonate ester | Increase in Yellowness % |
|---|---|---|---|
| Control 1 | 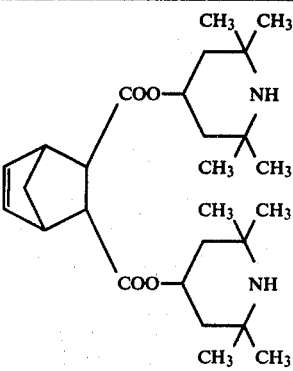 | None | 18 |

TABLE VIII-continued

| Example No. | Piperidyl ester | Phosphonate ester | Increase in Yellowness % |
|---|---|---|---|
| 36 | (3,5-di-t-Bu-4-HO-phenyl)-C₂H₄COO-CH₂-[C₂H₅, spiro dioxane with 2,2,6,6-tetramethylpiperidine] | Dibenzyl benzyl phosphonate | 8 |
| 37 | Norbornene-2,3-bis(COO-2,2,6,6-tetramethylpiperidin-4-yl) | Dilauryl lauryl phosphonate | 9 |
| 38 | 1,3,5-tris[C₂H₄COO-(2,2,6,6-tetramethylpiperidin-4-yl)]-triazine-2,4,6-trione | Diphenyl phenyl phosphonate | 8 |
| 39 | Tetrakis(2,2,6,6-tetramethylpiperidin-4-yl) ethylene tetracarboxylate (C=C with four OOC/COO groups) | Neopentyl benzyl phosphonate | 10 |
| 40 | N,N,N',N'-tetrakis[C₂H₄COO-(2,2,6,6-tetramethylpiperidin-4-yl)]-1,6-hexanediamine | Di-(nonylphenyl) benzyl phosphonate | 8 |

The effectiveness of the stabilizer systems of the invention in resisting a yellow discoloration from $NO_x$ gas is apparent from the data.

Having regard to the foregoing disclosure, the following is claimed as inventive and patentable embodiments thereof:

1. A stabilizer composition for organic polymeric materials comprising
   (a) a 2,2,6,6-tetramethyl-4-piperidyl carboxylic acid ester in an amount from about 90 to about 35 parts by weight and having the general formula:

$$\left[ R_1-O-\underset{\underset{O}{\|}}{C} \right]_n Z$$

wherein:

$R_1$ is selected from the group consisting of

[structures showing piperidyl and spiro-piperidyl groups with Y—N, CH₃ substituents, and R₆, CH₂— groups]

Y is selected from the group consisting of hydrogen and O·;

$R_6$ is lower alkyl having from one to two carbon atoms;

n is selected from the group consisting of 1, 2, 3 and 4; and

Z is an organic radical having a valence from 1 to 4, the valence positions being taken by $$\left[ R_1-O-\underset{\underset{O}{\|}}{C}- \right] \text{groups,}$$

and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; tris (N,N',N''-alkylene)cyanuric acid, bis (N,N'-alkylene)piperazine, cycloaklyl, cycloaklenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;

(b) a phosphonic acid ester in an amount of from about 10 to about 35 parts by weight; and (c) a phenolic antioxidant in an amount of from about 10 to about 35 parts by weight.

2. A stabilizer composition according to claim 1 in which n is one.

3. A stabilizer composition according to claim 1 in which n is two.

4. A stabilizer composition according to claim 1 in which n is three.

5. A stabilizer composition according to claim 1 in which n is four.

6. A stabilizer composition according to claim 1 in which Z is alkyl.

7. A stabilizer composition according to claim 1 in which Z is alkylene.

8. A stabilizer composition according to claim 1 in which Z is $$\text{aminoalkylene}-A-N\begin{matrix}A-\\ \diagup\\ \diagdown\\ A-\end{matrix}$$

where A is alkylene.

9. A stabilizer composition according to claim 1 in which Z is hydroxyarylenealkylene HO—Ar—A— where Ar is arylene and A is alkylene.

10. A stabilizer composition according to claim 1 in which Z is arylene.

11. A stabilizer composition according to claim 1 in which Z is cycloalkylene—⟨⟩ where ⟨⟩ is a cycloalkylene ring with one ethylenically unsaturated >C=C< bond.

12. A stabilizer composition according to claim 1 in which $R_1$ is

[structure showing spiro piperidyl group with Y—N and CH₃ substituents and O linkages]

13. A stabilizer composition according to claim 1 in which $R_1$ is

[structure showing spiro piperidyl group with Y—N, CH₃ substituents, R₆ and CH₂— group]

14. A stabilizer composition according to claim 1 in which $R_1$ is

[structure showing spiro piperidyl group with Y—N, CH₃ substituents, O and CH₂— linkages]

15. A stabilizer composition according to claim 1 in which $R_1$ is

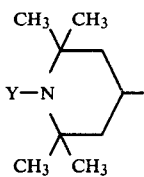

16. A stabilizer composition according to claim 1 in which the phosphonic acid ester has the formula:

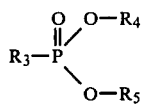

wherein

R$_3$, R$_4$ and R$_5$ are selected from the group consisting of alkyl and alkenyl having from about one or two to about thirty carbon atoms; cycloalkyl and cycloalkenyl having from three to about twelve carbon atoms; aryl, alkaryl and aralkyl having from six to about thirty carbon atoms, and alkoxyalkylene and alkoxypolyoxyalkylene in which the alkoxy and alkylene have from one or two to about thirty carbon atoms, and R$_4$ and R$_5$ taken together as an alkylene, cycloalkylene or arylene having from two to about thirty carbon atoms.

17. A stabilizer composition according to claim 1 in which the phenolic antioxidant has at least one phenolic hydroxyl group, at least one phenolic nucleus, and from about eight to about three hundred carbon atoms.

18. A stabilizer composition according to claim 17 in which the phenolic antioxidant is a monocyclic phenol having the structure:

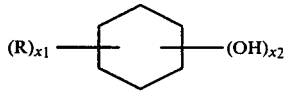

wherein

R is selected from the group consisting of hydrogen; halogen, and organic radicals containing from one to about thirty carbon atoms selected from the group consisting of alkyl, aryl, alkenyl, alkaryl, aralkyl, cycloalkenyl, cycloalkyl, alkoxy, and

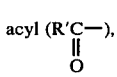

where R' is aryl, alkyl or cycloalkyl;

x$_1$ and x$_2$ are integers from one to four, and the sum of x$_1$ and x$_2$ does not exceed six.

19. A stabilizer composition according to claim 17 in which the antioxidant has the formula:

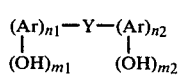

wherein

Y is a polyvalent linking group selected from the group consisting of oxygen; carbonyl, sulfur; sulfinyl aromatic, aliphatic and cycloaliphatic hydrocarbon groups, and oxyhydrocarbon and thiohydrocarbon groups having from one up to twenty carbon atoms;

Ar is a phenolic nucleus containing at least one free phenolic hydroxyl group up to a total of five;

m$_1$ and m$_2$ are numbers from one to five, and n$_1$ and n$_2$ are numbers from one to four.

20. A stabilizer composition according to claim 19 in which Ar is a benzene nucleus.

21. A polyvinyl chloride resin composition having improved resistance to deterioration when heated at 350° F., comprising a polyvinyl chloride resin formed at least in part of the recurring group

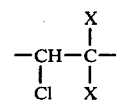

and having a chlorine content in excess of 40%, where X is either hydrogen or chlorine; and an amount to enhance the resistance to deterioration of the resin of a stabilizer composition comprising (a) a 2,2,6,6-tetramethyl-4-piperidyl carboxylic acid ester in an amount from about 90 to about 35 parts by weight and having the general formula:

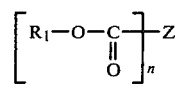

wherein:

R$_1$ is selected from the group consisting of

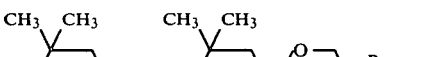

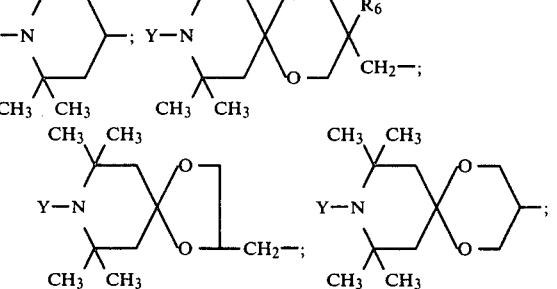

Y is selected from the group consisting of hydrogen and O·;

R$_6$ is lower alkyl having from one to two carbon atoms;

n is selected from the group consisting of 1, 2, 3 and 4; and z is an organic radical having a valence from 1 to 4, the valence positions being taken by

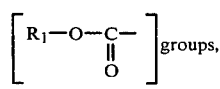

and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;

(b) a phosphonic acid ester in an amount of from about 10 to about 35 parts by weight; and (c) a phenolic antioxidant in an amount of from about 10 to about 35 parts by weight.

22. A polyvinyl chloride resin composition in accordance with claim 21, in which the polyvinyl chloride resin is polyvinyl chloride homopolymer.

23. A polyvinyl chloride resin composition in accordance with claim 21, in which the polyvinyl chloride resin is a copolymer of vinyl chloride and vinyl acetate.

24. An olefin polymer composition having improved resistance to deterioration comprising an olefin polymer selected from the group consisting of polymers of alpha-olefins having from two to six carbon atoms and polystyrene, and an amount to enhance the resistance of the polymer to deterioration of a stabilizer composition comprising (a) a 2,2,6,6-tetramethyl-4-piperidyl carboxylic acid ester in an amount from about 90 to about 35 parts by weight and having the general formula:

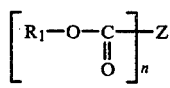

wherein:
$R_1$ is selected from the group consisting of

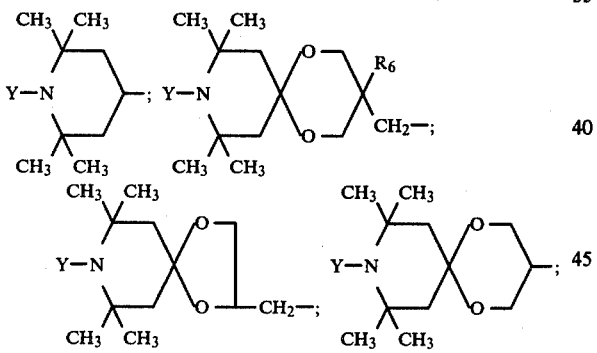

Y is selected from the group consisting of hydrogen and O·;

$R_6$ is lower alkyl having from one to two carbon atoms;

n is selected from the group consisting of 1, 2, 3 and 4; and is an organic radical having a valence from 1 to 4, the valence positions being taken by

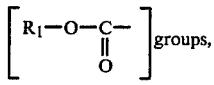 groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene, cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;

(b) a phosphonic acid ester in an amount of from about 10 to about 35 parts by weight; and (c) a phenolic antioxidant in an amount of from about 10 to about 35 parts by weight.

25. An olefin polymer composition in accordance with claim 24, wherein the polyolefin is polypropylene.

26. An olefin polymer composition in accordance with claim 24, wherein the polyolefin is polyethylene.

27. An acrylonitrile-butadiene-styrene polymer having improved resistance to deterioration when heated at 300° F. comprising an acrylonitrile-butadiene-styrene polymer and an amount to enhance its resistance to deterioration of a stabilizer composition comprising (a) a 2,2,6,6-tetramethyl-4-piperidyl carboxylic acid ester in an amount from about 90 to about 35 parts by weight and having the general formula:

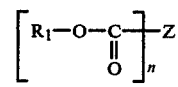

wherein:
$R_1$ is selected from the group consisting of

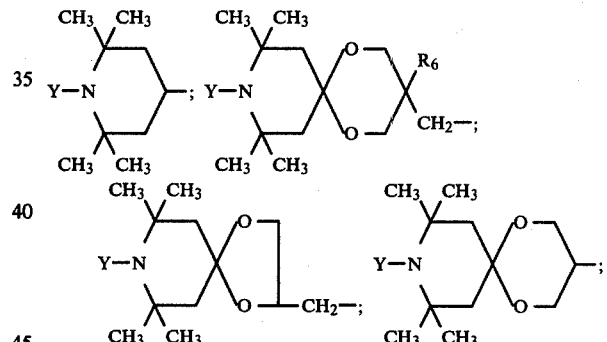

Y is selected from the group consisting of hydrogen and O·;

$R_6$ is lower alkyl having from one to two carbon atoms;

n is selected from the group consisting of 1, 2, 3 and 4; and is an organic radical having a valence from 1 to 4, the valence positions being taken by

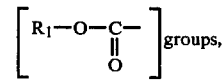 groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;
(b) a phosphonic acid ester in an amount of from about 10 to about 35 parts by weight; and
(c) a phenolic antioxidant in an amount of from about 10 to about 35 parts by weight.

28. A polyester resin composition having improved resistance to deterioration comprising a polyester resin and an amount to enhance the resistance of the polymer to deterioration of a stabilizer composition comprising
(a) a 2,2,6,6-tetramethyl-4-piperidyl carboxylic acid ester in an amount from about 90 to about 35 parts by weight and having the general formula:

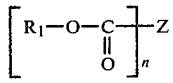

wherein:
$R_1$ is selected from the group consisting of

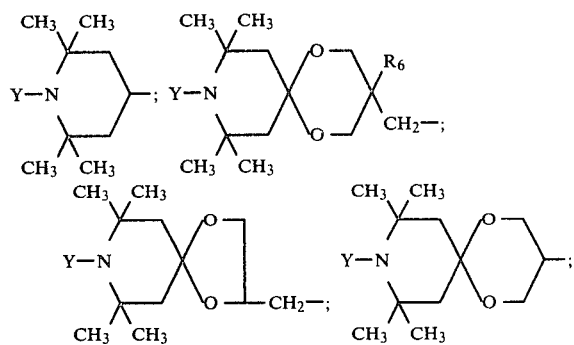

Y is selected from the group consisting of hydrogen and O·;
$R_6$ is lower alkyl having from one to two carbon atoms;
n is selected from the group consisting of 1, 2, 3 and 4; and is an organic radical having a valence from 1 to 4, the valence positions being taken by

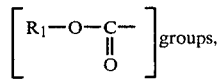 groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;
(b) a phosphonic acid ester in an amount of from about 10 to about 35 parts by weight; and
(c) a phenolic antioxidant in an amount of from about 10 to about 35 parts by weight.

29. A polyamide resin composition having improved resistance to deterioration comprising a polyamide resin and an amount to enhance the resistance of the polymer to deterioration of a stabilizer composition comprising
(a) a 2,2,6,6-tetramethyl-4-piperidyl carboxylic acid ester in an amount from about 90 to about 35 parts by weight and having the general formula:

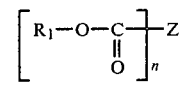

wherein:
$R_1$ is selected from the group consisting of

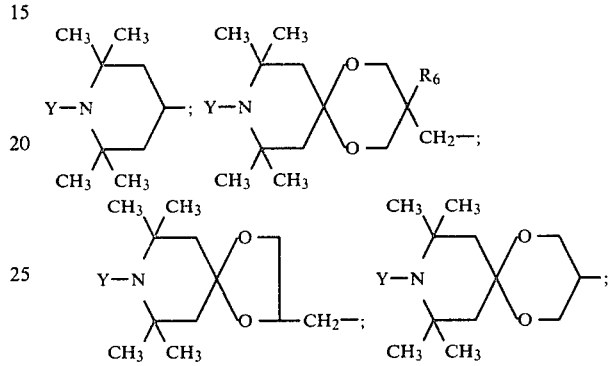

Y is selected from the group consisting of hydrogen and O·;
$R_6$ is lower alkyl having from one to two carbon atoms;
n is selected from the group consisting of 1, 2, 3 and 4; and
is an organic radical having a valence from 1 to 4, the valence positions being taken by

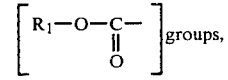 groups, and from one to about twenty carbon atoms, and selected from the group consisting of alkyl, alkenyl, alkylene, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;
(b) a phosphonic acid ester in an amount of from about 10 to about 35 parts by weight; and
(c) a phenolic antioxidant in an amount of from about 10 to about 35 parts by weight.

30. An ethylene-vinyl acetate copolymer composition having improved resistance to deterioration comprising an ethylene-vinyl acetate copolymer and an amount to enhance the resistance of the polymer to deterioration of a stabilizer composition comprising
(a) a 2,2,6,6-tetramethyl-4-piperidyl carboxylic acid ester in an amount from about 90 to about 35 parts by weight and having the general formula:

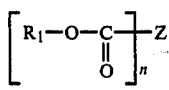

wherein:

R₁ is selected from the group consisting of

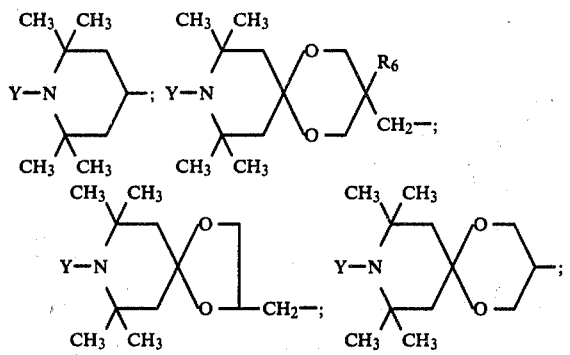

Y is selected from the group consisting of hydrogen and O-;

R₆ is lower alkyl having from one to two carbon atoms;

n is selected from the group consisting of 1, 2, 3 and 4; and is an organic radical having a valence from 1 to 4, the valence positions being taken by

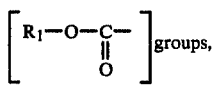 groups, and from one to about twenty carbon atoms, and selected from the group consisting of alkyl, alkenyl, alkenylene, alkylidene; aryl, arylene, aralkyl, aralkylene, aralkylidene, alkaryl, alkarylene, alkarylidene; cycloalkyl, cycloalkenyl, cycloalkylene, cycloalkenylene, cycloalkylidene, alkcycloalkyl, alkcycloalkenyl, alkcycloalkenylene, alkcycloalkylene, cycloalkalkylene, cycloalkalkyl, cycloalkalkenyl, and cycloalkalkenylene, aminoalkylene, nitriloalkylene and hydroxyarylenealkylene;

(b) a phosphonic acid ester in an amount of from about 10 to about 35 parts by weight; and (c) a phenolic antioxidant in an amount of from about 10 to about 35 parts by weight.

31. A polyvinyl chloride resin composition having improved resistance to deterioration when heated at 350° F., comprising a polyvinyl chloride resin formed at least in part of the recurring group

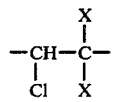

and having a chlorine content in excess of 40%, where X is either hydrogen or chlorine; and an amount to enhance the resistance to deterioration of the resin of a stabilizer composition comprising dibutyl benzyl phosphonate, 2,6-di-tert butyl-p-cresol, and the piperidine compound

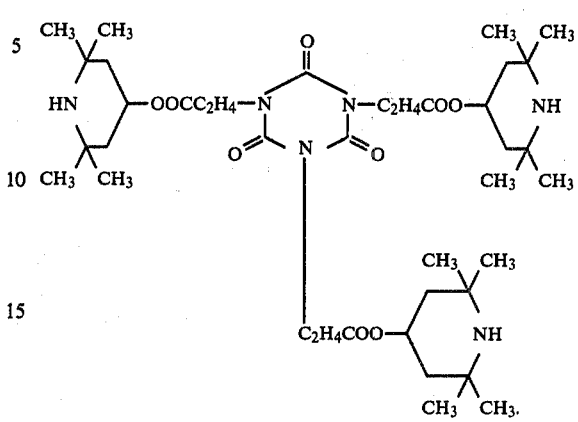

32. An olefin polymer composition having improved resistance to deterioration comprising an olefin polymer selected from the group consisting of polymers of alpha-olefins having from two to six carbon atoms and polystyrene, and an amount to enhance the resistance of the polymer to deterioration of a stabilizer composition comprising diphenyl phenyl phosphonate, 1,3,5-tris(3,5-di-t-butyl-4-hydroxy benzyl)-isocyanurate and the piperidine compound

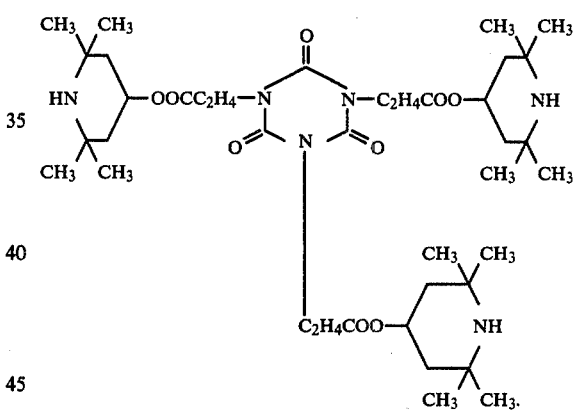

33. An acrylonitrile-butadiene-styrene polymer having improved resistance to deterioration when heated at 300° F. comprising an acrylonitrile-butadiene-styrene polymer and an amount to enhance its resistance to deterioration of a stabilizer composition comprising dibutyl benzyl phosphonate, 4,4'-n-butylidene-bis(2-t-butyl-5-methylphenol) and the piperidine compound

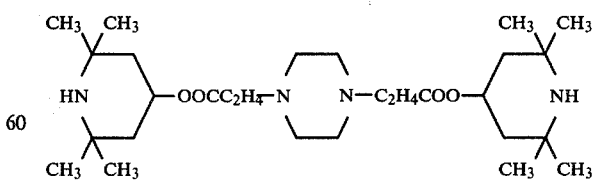

34. A polyester resin composition having improved resistance to deterioration comprising a polyester resin and an amount to enhance the resistance of the polymer to deterioration of a stabilizer composition comprising di-(octylphenyl) benzyl phosphonate, 1,3,5-tris-(3,5-dit-butyl-4-hydroxybenzyl)-2,4,6-tri methyl benzene and the piperidine compound

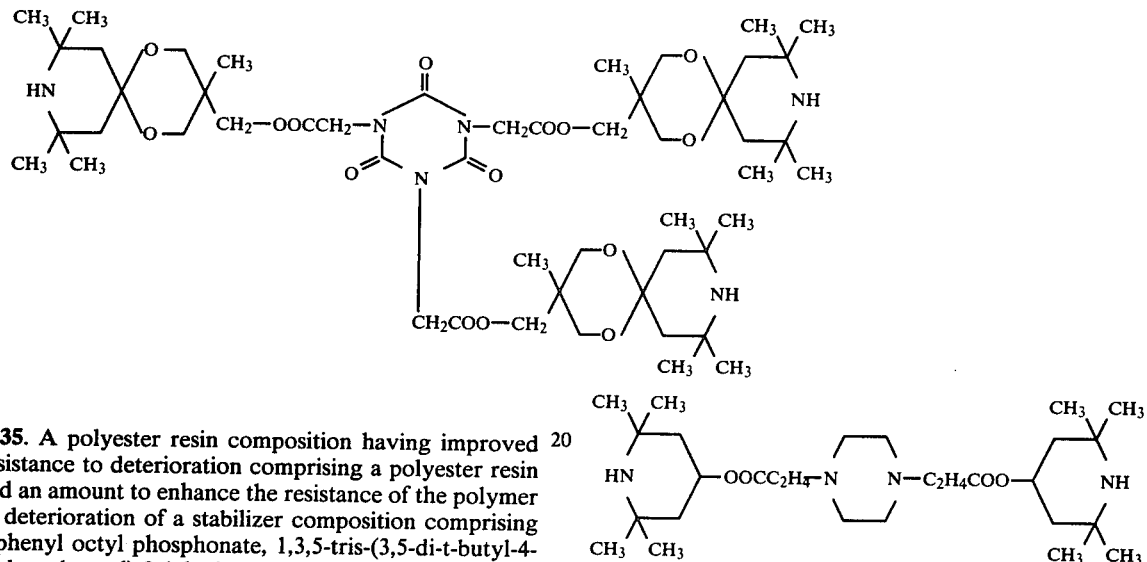

35. A polyester resin composition having improved resistance to deterioration comprising a polyester resin and an amount to enhance the resistance of the polymer to deterioration of a stabilizer composition comprising diphenyl octyl phosphonate, 1,3,5-tris-(3,5-di-t-butyl-4-hydroxybenzyl)-2,4,6-tri methyl benzene and the piperidine compound

* * * * *

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Abstract [57] Column 2, line 26 : "O." should be --O·--
Column 3, line 63 : "(-O.)" should be --(-O·)--
Column 6, line 9 :

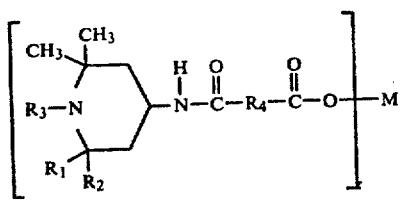

should be

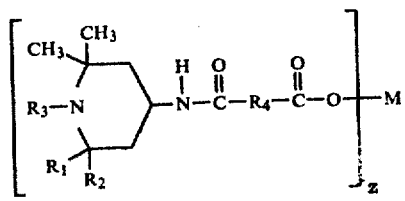

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 6, line 24 : "grou" should be --group--.
Column 6, line 25 : Please delete "p".
Column 6, line 54 : "substututed" should be --substituted--.
Column 7, line 1 : "found" should be --bound--.
Column 7, line 1 : "cyclobexyl" should be --cyclohexyl--.
Column 11, line 44 : Please delete "m".
Column 11, line 47 : "atoms" should be --atom--.
Column 11, line 65 : "no" should be --n--.
Column 12, lines 5 & 6 :
$$,-CH-_2COO-R_7-O-COCH_2-$$

should be $$-CH_2COO-R_7-O-COCH_2-$$

Column 12, lines 9 & 10:
$$-CH_2CH_2-O\ CO(-R_8-)_n CO\ ;\ O-CH_2CH_2-$$

should be $$_n CH_2CH_2-O\ CO(-R_8-)_m CO\ O-CH_2CH_2-$$

UNITED STATES PATENT AND TRADEMARK OFFICE
CERTIFICATE OF CORRECTION

PATENT NO. : 4,210,577
DATED : July 1, 1980
INVENTOR(S) : Motonobu Minagawa et al It is certified that error appears in the above-identified patent and that said Letters Patent are hereby corrected as shown below:

Column 12, line 40 :

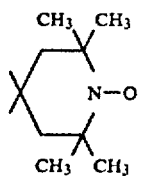

should be

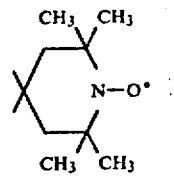

Column 12, line 45 : "Murayanna" should be --Murayama--.
Column 12, line 60 : "atoms" should be --atom--.
Column 13, line 22 : Please insert --p-- before "is".
Column 14, line 15 :

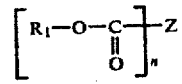

should be

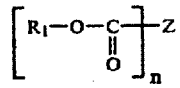

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 14, line 37 : "O." should be --O˙--.
Column 15, line 7 : "anylene" should be --amylene--.
Column 15, line 9 : after "propylidene" please insert a comma --(,)--
Column 19, Formula 13:

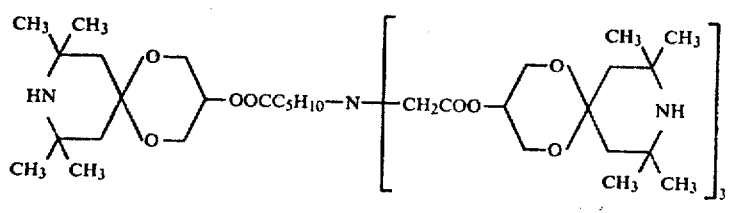

should be

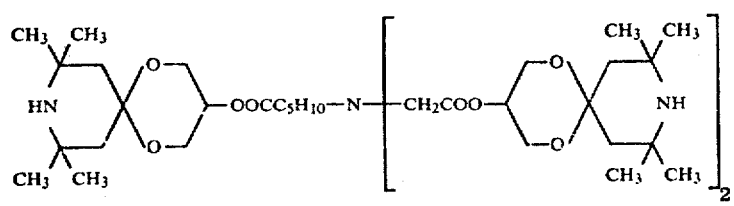

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 25, Formula 24 :

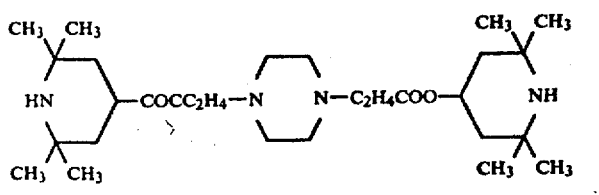

should be

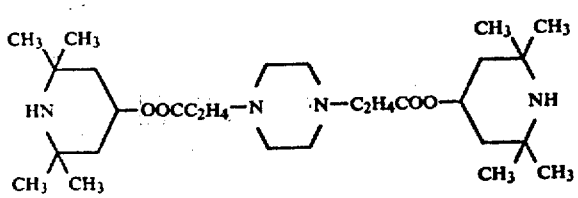

Column 28, line 8 : "naphylphosphonate" should be -- naphthylphosphonate --.

Column 31, line 40 :

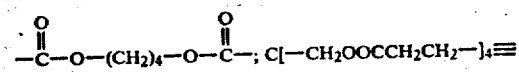

should be

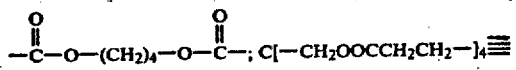

UNITED STATES PATENT AND TRADEMARK OFFICE
CERTIFICATE OF CORRECTION

PATENT NO. : 4,210,577
DATED : July 1, 1980
INVENTOR(S) : Motonobu Minagawa et al It is certified that error appears in the above-identified patent and that said Letters Patent are hereby corrected as shown below:

Column 33, line 28 :

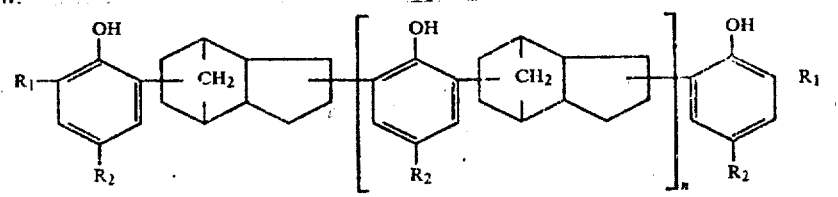

should be

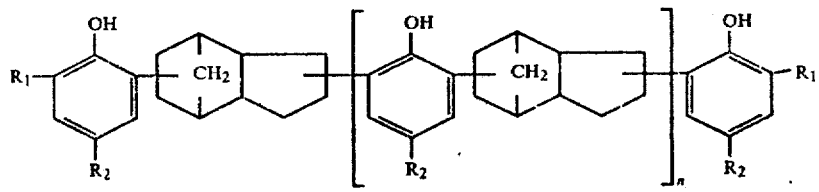

Column 34, line 34 : ti    $R_1O[OCCH_2CH_2SCH_2CH_2COOXO]_nOCCH_2CH_2-S-CH_2CH_2COOZ$ should be $R_1O[OCCH_2CH_2SCH_2CH_2COOXO]_nOCCH_2CH_2-S-CH_2CH_2COOZ$ United States Patent and Trademark Office

CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 35, line 1 :

(c) $R_1O[OCCH_2CH_2SCH_2CH_2COOX-O]-$ $_{,}OCCH_2CH_2SCH_2CH_2COOZ$ should be (c) $R_1O[OCCH_2CH_2SCH_2CH_2COOX-O]_n OCCH_2CH_2SCH_2CH_2COOZ$ Column 36, line 5 : "odiproprionate" should be --odipropionate--.
Column 39, line 41 : "6' " should be --6, 1' --.
Column 39, line 67 : "dicylohexyl" should be --dicyclohexyl--.
Column 40, line 36 : "estertriphosphite" should be --ester-triphosphite--.
Column 40, line 39 : "heatand" should be --heat and--.
Column 42, line 47 :

The following Examples illustrate preferred stabilizer systems of the invention. EXAMPLES 1 to 5 should be

The following Examples illustrate preferred stabilizer systems of the invention.

EXAMPLES 1 to 5

UNITED STATES PATENT AND TRADEMARK OFFICE
CERTIFICATE OF CORRECTION

PATENT NO. : 4,210,577  
DATED : July 1, 1980  
INVENTOR(S) : Motonobu Minagawa et al Page 8 of 18

It is certified that error appears in the above-identified patent and that said Letters Patent are hereby corrected as shown below:

Column 47, Formula 8 :

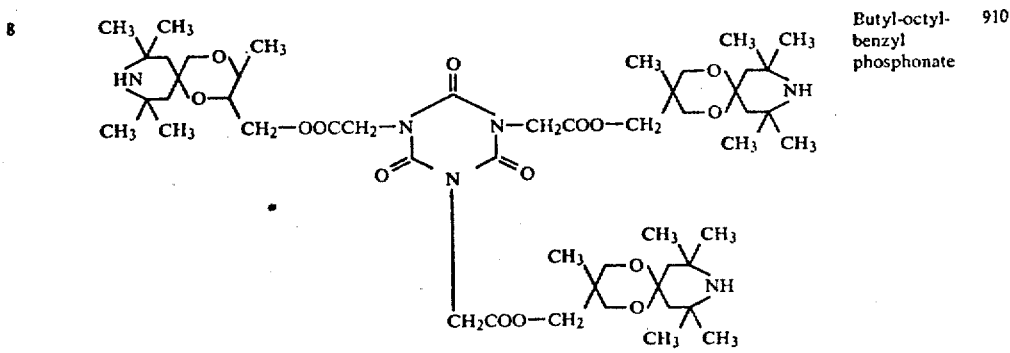

should be

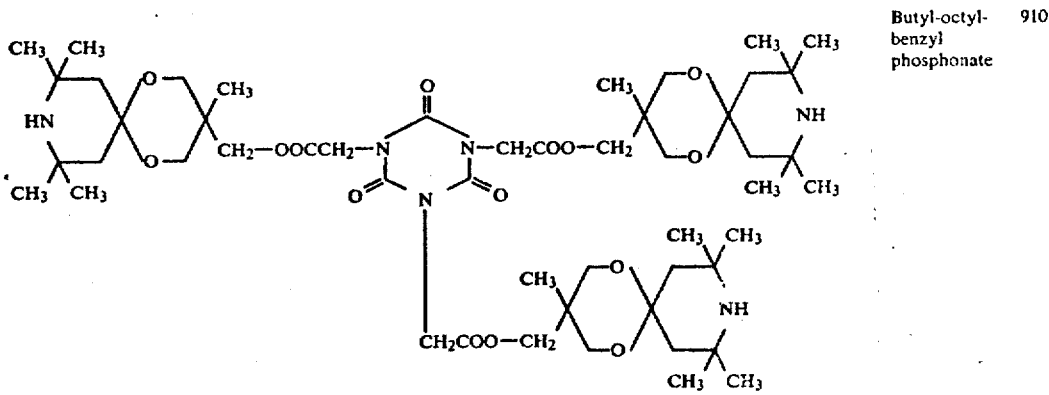

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above–identified patent and that said Letters Patent are hereby corrected as shown below:

Column 51, Formula 12 :

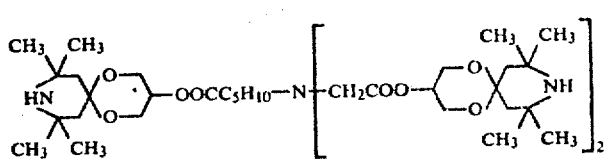

should be

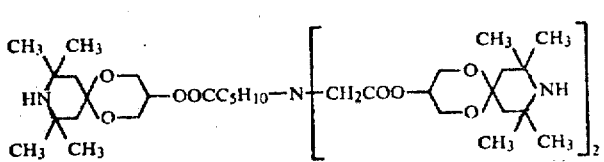

Column 51, Example No. 13,
Under heading Phosphonate ester : "Dihenyl" should be --Diphenyl--.

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 51, line 68
under heading Ingredient : Please insert --propionate)-- after "butylphenyl"

| Ingredient | Parts by Weight |
|---|---|
| High-density polyethylene | 100 |
| Calcium stearate | 1 |
| Thiodiglycol bis-(4-hydroxy-3,5-di-t-butylphenyl | 0.2 | should be

| Ingredient | Parts by Weight |
|---|---|
| High-density polyethylene | 100 |
| Calcium stearate | 1 |
| Thiodiglycol bis-(4-hydroxy-3,5-di-t-butylphenyl propionate) | 0.2 |

Column 52, line 55
under heading Ingredient : Please delete "propionate)"

-continued

| Ingredient | Parts by Weight |
|---|---|
| 55 propionate) | |
| Piperidyl ester as shown in Table IV | 0.25 |
| Phosphonate ester as shown in Table IV | 0.2 | should be

-continued

| Ingredient | Parts by Weight |
|---|---|
| 55 | |
| Piperidyl ester as shown in Table IV | 0.25 |
| Phosphonate ester as shown in Table IV | 0.2 |

UNITED STATES PATENT AND TRADEMARK OFFICE
CERTIFICATE OF CORRECTION

PATENT NO. : 4,210,577
DATED : July 1, 1980
INVENTOR(S) : Motonobu Minagawa et al It is certified that error appears in the above-identified patent and that said Letters Patent are hereby corrected as shown below:

Column 53, Control 2 :

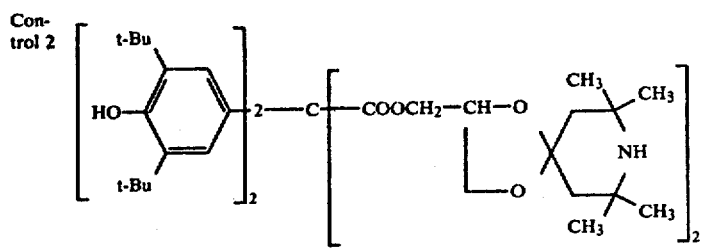

should be

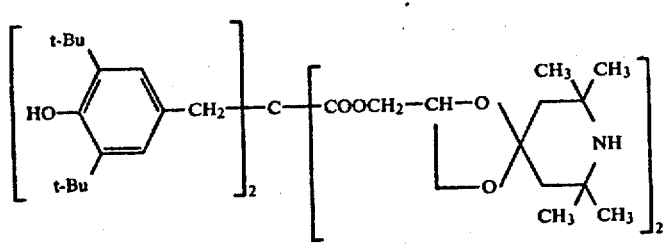

Column 54, Example 15 : "benzil" should be --benzyl--.

UNITED STATES PATENT AND TRADEMARK OFFICE
CERTIFICATE OF CORRECTION

PATENT NO. : 4,210,577
DATED : July 1, 1980
INVENTOR(S) : Motonobu Minagawa et al It is certified that error appears in the above-identified patent and that said Letters Patent are hereby corrected as shown below:

Column 55, Example 19 :

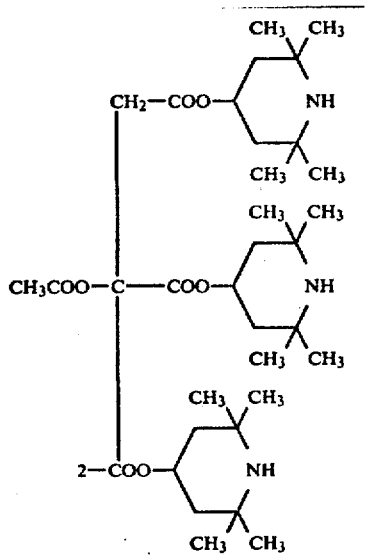   should be   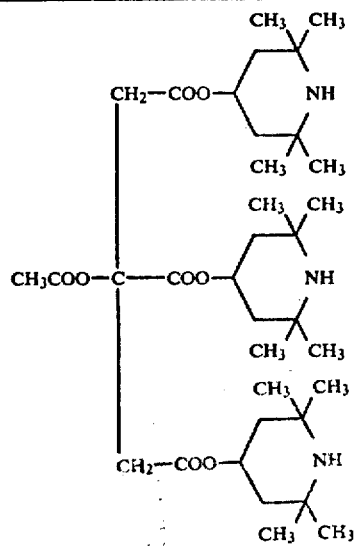

Column 55, Formula 20 :

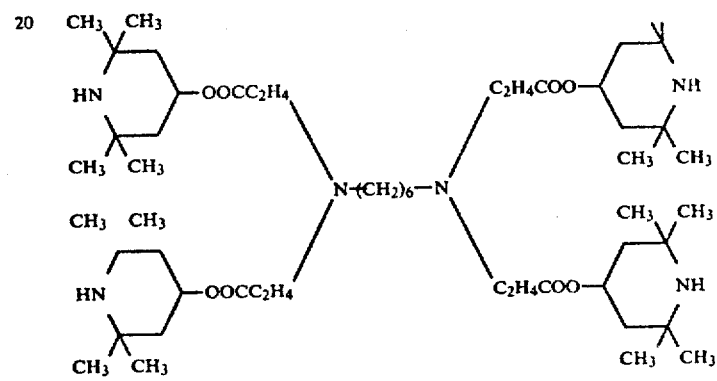

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

should be

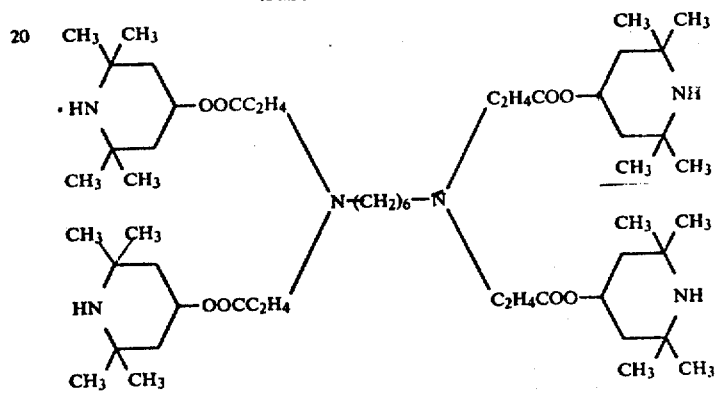

Column 55, line 47 : "EXAMPLES 21 to 30" should be --EXAMPLES 21 to 26--.

Column 59, Example 25 :

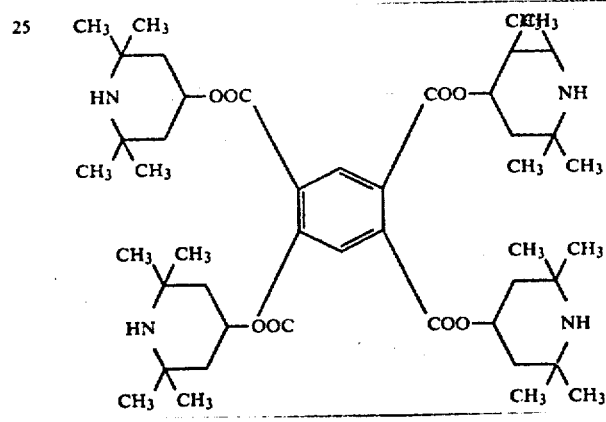

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

should be

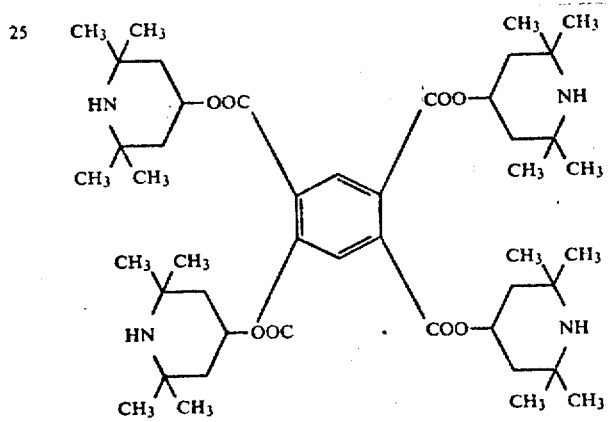

Columns 59 & 60 :   Following "Example 25" please insert --Example 26--

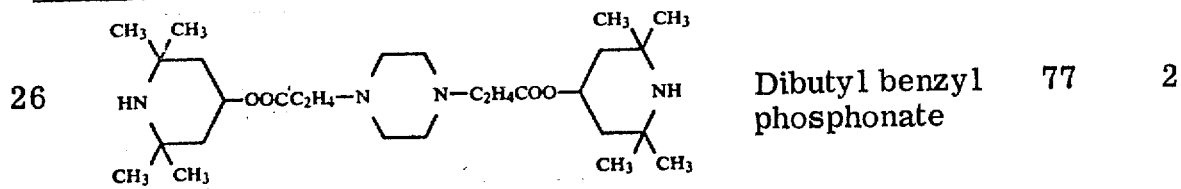

Column 59, line 26 : "EXAMPLES 27 to 36" should be --EXAMPLES 27 to 30--.

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 61, line 69: Please insert --trimethyl benzene-- after "6-".

| Ingredient | Parts by Weight |
|---|---|
| Polybutylene terephthalate | 100 |
| 1,3,5-tris-(3,5-di-t-butyl-4-hydroxy benzyl)-2,4,6- | 0.1 | should be

| Ingredient | Parts by Weight |
|---|---|
| Polybutylene terephthalate | 100 |
| 1,3,5-tris-(3,5-di-t-butyl-4-hydroxy benzyl)-2,4,6-trimethyl benzene | 0.1 |

Column 62, line 60 : Please delete "trimethyl benzene"

| Ingredient | Parts by Weight |
|---|---|
| trimethyl benzene | |
| Piperidyl ester as shown in Table VII | 0.4 |
| Phosphonate ester as shown in Table VII | 0.5 | should be

| Ingredient | Parts by Weight |
|---|---|
| Piperidyl ester as shown in Table VII | 0.4 |
| Phosphonate ester as shown in Table VII | 0.5 |

UNITED STATES PATENT AND TRADEMARK OFFICE
CERTIFICATE OF CORRECTION

PATENT NO. : 4,210,577
DATED : July 1, 1980
INVENTOR(S) : Motonobu Minagawa et al It is certified that error appears in the above-identified patent and that said Letters Patent are hereby corrected as shown below:

Column 65, Example 35 :

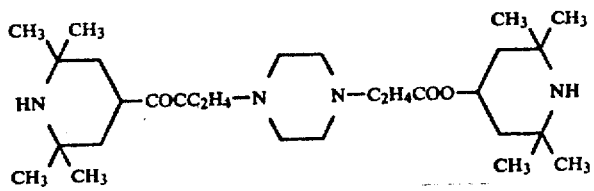

should be

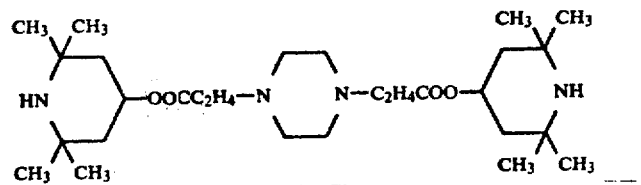

Column 67, Example 40 :

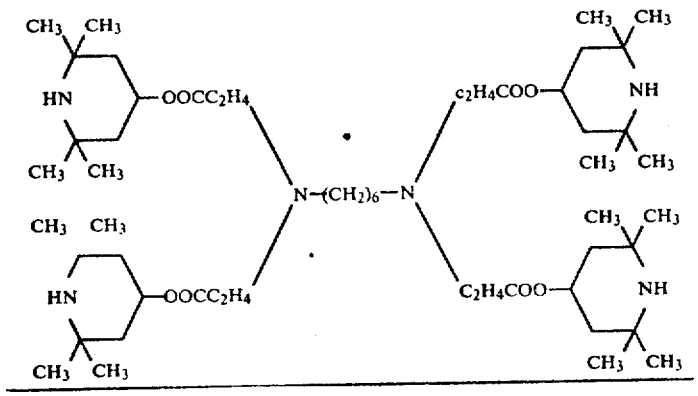

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

should be

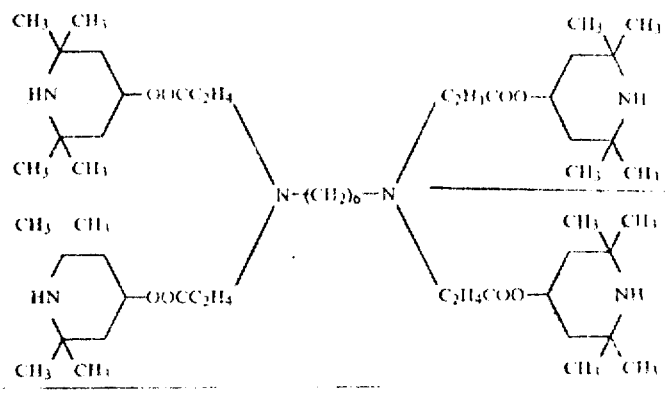

| | |
|---|---|
| Column 69, line 37 : | "O." should be --O'--. |
| Column 69, line 55 : | "cycloaklyl" should be --cycloalkyl--. |
| Column 69, line 56 : | "cycloaklenyl" should be --cycloalkenyl--. |
| Column 72, line 51 : | "O." should be --O'--. |
| Column 72, line 56 : | "z" should be -- $\underline{Z}$ --. |
| Column 73, line 51 : | "O." should be --O'--. |
| Column 73, line 56 : | Please insert -- $\underline{Z}$ -- before "is". |
| Column 74, line 48 : | "O." should be --O'--. |
| Column 74, line 53 : | Please insert -- $\underline{Z}$ -- before "is". |
| Column 75, line 40 : | "O." should be --O'--. |
| Column 75, line 44 : | Please insert -- $\underline{Z}$ -- before "is". |

4; and is an organic radical having a valence from should be

4; and $\underline{Z}$ is an organic radical having a valence from

UNITED STATES PATENT AND TRADEMARK OFFICE
CERTIFICATE OF CORRECTION

PATENT NO. : 4,210,577

DATED : July 1, 1980

INVENTOR(S) : Motonobu Minagawa et al

It is certified that error appears in the above-identified patent and that said Letters Patent are hereby corrected as shown below:

Column 76, line 31 : "O." should be --$\overset{\bullet}{O}$--.
Column 76, line 36 : Please insert -- $Z$ -- before "is".
Column 77, line 25 : "O." should be --$\overset{\bullet}{O}$--.
Column 77, line 31 : Please insert -- $Z$ -- before "is".

Signed and Sealed this

Eighteenth Day of November 1980

[SEAL]

Attest:

SIDNEY A. DIAMOND

Attesting Officer

Commissioner of Patents and Trademarks